US011761770B2

(12) United States Patent
Davis et al.

(10) Patent No.: US 11,761,770 B2
(45) Date of Patent: Sep. 19, 2023

(54) DETERMINING RIDERSHIP ERRORS BY ANALYZING PROVIDER-REQUESTOR CONSISTENCY SIGNALS ACROSS RIDE STAGES

(71) Applicant: Lyft, Inc., San Francisco, CA (US)

(72) Inventors: Matthew Allen Davis, San Francisco, CA (US); Jayaprabhakar Kadarkarai, Foster City, CA (US); Eshaan Bhalla, San Francisco, CA (US); Fadi Al Sayed Hassan, Edmonds, WA (US); Ramachandran Gurumoorthy, Sammamish, WA (US); Neil Pradip Shah, San Carlos, CA (US); Suresh Pragada, Dublin, CA (US); Thanigaivel Ashwin Raj, San Ramon, CA (US); Nathan Van Fleet, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 786 days.

(21) Appl. No.: 16/692,783

(22) Filed: Nov. 22, 2019

(65) Prior Publication Data

US 2021/0156700 A1    May 27, 2021

(51) Int. Cl.
| | | |
|---|---|---|
| *G01C 21/34* | (2006.01) | |
| *G06Q 10/02* | (2012.01) | |
| *G10L 25/63* | (2013.01) | |
| *G10L 17/06* | (2013.01) | |
| *G01C 21/16* | (2006.01) | |

(Continued)

(52) U.S. Cl.
CPC ......... *G01C 21/3415* (2013.01); *G01C 21/16* (2013.01); *G06N 3/08* (2013.01); *G06Q 10/02* (2013.01); *G10L 17/00* (2013.01); *G10L 17/06* (2013.01); *G10L 25/63* (2013.01)

(58) Field of Classification Search
CPC ...... G01C 21/3415; G01C 21/16; G06N 3/08; G06Q 10/02; G10L 17/00; G10L 17/06; G10L 25/63
See application file for complete search history.

(56) References Cited

U.S. PATENT DOCUMENTS

| | | | | |
|---|---|---|---|---|
| 2018/0299895 A1* | 10/2018 | Knotts | ................... | H04L 67/12 |
| 2019/0035041 A1* | 1/2019 | Yamaguchi | .......... | G06Q 50/265 |
| 2019/0066003 A1* | 2/2019 | Dyer | ................... | G06Q 10/025 |

(Continued)

*Primary Examiner* — Hunter B Lonsberry
*Assistant Examiner* — Harrison Heflin
(74) *Attorney, Agent, or Firm* — Keller Preece PLLC

(57) ABSTRACT

The present disclosure relates to systems, non-transitory computer readable media, and methods for detecting and providing a digital notification of whether a ridership error exists. For instance, a ridership error detection system identifies a transportation match between a requestor device and a provider device. The ridership error detection system determines one or more sets of provider-requestor consistency signals from the requestor device and the provider device across ride stages. For instance, the ridership error detection system analyzes location signals, IMU signals, audio signals, local wireless signals indicating distances between the requestor device and the provider device, and other signals to determine whether a ridership error exists. The ridership error detection system provides digital notifications to the provider device and the requestor device based on the ridership error determination.

20 Claims, 20 Drawing Sheets

(51) Int. Cl.
    *G10L 17/00*    (2013.01)
    *G06N 3/08*    (2023.01)

(56) References Cited

U.S. PATENT DOCUMENTS

| | | | |
|---|---|---|---|
| 2019/0130243 A1* | 5/2019 | Penubothula | G01C 21/3484 |
| 2019/0205785 A1* | 7/2019 | Volk | G06N 20/00 |
| 2019/0318159 A1* | 10/2019 | Blanc-Paques | G06Q 50/30 |
| 2020/0065722 A1* | 2/2020 | Smith | H04W 4/023 |
| 2020/0260217 A1* | 8/2020 | Choi | H04W 4/023 |
| 2020/0359215 A1* | 11/2020 | Akpinar | G06Q 50/30 |
| 2021/0073825 A1* | 3/2021 | Walling | H04L 67/12 |
| 2021/0094508 A1* | 4/2021 | Krishnamurthi | H04W 4/024 |
| 2022/0051149 A1* | 2/2022 | Livne-Simha | H04W 4/027 |

\* cited by examiner

200

| Identify Different Sets Of Provider-Requestor Consistency Signals Across Different Ride Stages 202 | |
|---|---|
| Provider Approach Stage 210 | • Location Signals<br>• Local Wireless Signals |
| Requestor Approach Stage 212 | • Local Wireless Signals<br>• IMU Signals |
| Open Car Door Stage 214 | • Audio Signals |
| Requestor Enter Stage 216 | • Local Wireless Signals<br>• IMU Signals |
| Close Car Door Stage 218 | • Audio Signals |
| Vehicle Movement Stage 220 | • Local Wireless Signals<br>• IMU Signals<br>• Location Signals<br>• Audio Signals |

Determine A Ridership Error Score 204

Provide A Digital Notification 206

*Fig. 2*

| Signal Strength | Stage | Action |
| --- | --- | --- |
| Not Found 410 | Provider Approach | |
| Far 412 | Provider Approach | |
| Near 414 | Provider Approach<br>Requestor Approach<br>Open Car Door | • Notify Requestor<br>• Notify Provider |
| Immediate 416 | Requestor Enter<br>Close Car Door<br>Vehicle Movement | • Commence Ride<br>• Access Audio Signals |

*Fig. 4B*

DETERMINING RIDERSHIP ERRORS BY ANALYZING PROVIDER-REQUESTOR CONSISTENCY SIGNALS ACROSS RIDE STAGES

BACKGROUND

Recent years have seen significant technological improvements in mobile app-based transportation matching systems. Indeed, the proliferation of web and mobile applications enable requesting computer devices to submit transportation requests via on-demand transportation matching systems. On-demand transportation matching systems can identify available provider computer devices that can provide transportation services from one geographic location to another and efficiently identify digital matches between provider computing devices and requestor computing devices.

Although conventional transportation matching systems can match requesting computing devices with provider computing devices, conventional transportation matching systems often face a number of technical problems, particularly with regard to accuracy, efficiency, and flexibility of operation. For example, because conventional transportation matching systems coordinate rides between requestor computing devices and driver computing devices via remote servers, such systems often result in mistakes in aligning the requestor computing devices and driver computing devices. For instance, in environments in which multiple provider computing devices exist at a pickup location, a requestor may enter the wrong vehicle (i.e., a vehicle that is not associated with the matched provider computing device). Such ridership errors not only disrupt the flow of matching transportation requests but may also pose a safety concern for requestors and/or providers.

In addition to accuracy concerns, conventional transportation matching systems are often inefficient. For instance, many conventional transportation matching systems attempt to prevent and identify ridership errors by transmitting information identifying the correct provider vehicle to the requestor and information identifying the correct requestor to the provider. As an initial matter, such approaches are often ineffectual, failing to identify and correct most errors. Moreover, such methods are often inefficient in that they take significant time for drivers and passengers to confirm or align data transmitted to their respective devices.

Some conventional systems seek to correct ridership errors by constantly monitoring location information of requestor devices and provider devices. Such an approach often requires significant computing and communication resources over the course of a ride. In addition, this approach is often inaccurate (inasmuch as location data itself is often inaccurate, particularly in dense urban areas) and slow to identify ridership errors (e.g., only after a rider device and provider device move to different locations do such approaches identify a problem). Accordingly, conventional systems often utilize additional time and computing resources to correct the negative effects of ridership errors. For example, conventional systems must often cancel existing rides and generate new rides from different pickup locations to remedy the negative effects of a ridership error.

Furthermore, conventional systems are also rigid and inflexible. Indeed, many of the accuracy and efficiency issues discussed above stem from the rigid approaches conventional systems utilize to identify ridership errors between requestor computing devices and provider computing devices. For instance, whether utilizing location data or matched data transmitted to devices, conventional systems rigidly focus on inflexible parameters that offer limited information regarding misalignment between provider computing devices and requestor computing devices. Focusing rigidly on location data, for example, often leads to identifying ridership errors after they occur (e.g., after a rider computing device has left in a vehicle). Indeed, in areas with poor GPS reception or cellular access, such systems cannot flexibly adapt to determine ridership errors.

These and other disadvantages exist with respect to conventional digital document analysis systems.

SUMMARY

One or more embodiments described herein provide benefits and solve one or more of the foregoing or other problems in the art with systems, methods, and non-transitory computer readable media that analyze sets of digital signals from provider and requestor devices across one or more ride stages to determine the likelihood of a ridership error. For example, the disclosed system can determine a transportation match between a requestor and a provider. As the ride progresses, the disclosed system can identify and monitor consistency between various digital signal types from both provider devices and requestor devices. For example, the disclosed systems can monitor low-energy Bluetooth signals, audio signals, and/or accelerometer signals at one or more phases of a ride. By analyzing these one or more signals at one or more ride stages, the disclosed systems can determine whether a ridership error exists between the vehicle used by the requestor and provider of the transportation match. Moreover, the disclosed systems can transmit digital notifications to requestor devices and provider devices based on these signals (e.g., to provide alerts regarding ridership errors, to initiate rides, or to confirm correct ridership for providers and requestors).

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 2 illustrates an overview of providing a digital notification based on whether a ridership error exists in accordance with one or more embodiments.

FIGS. 4A-4B illustrate utilizing local wireless signal strengths to determine distances between the requestor device and the provider device in accordance with one or more embodiments.

DETAILED DESCRIPTION

Figure 1:
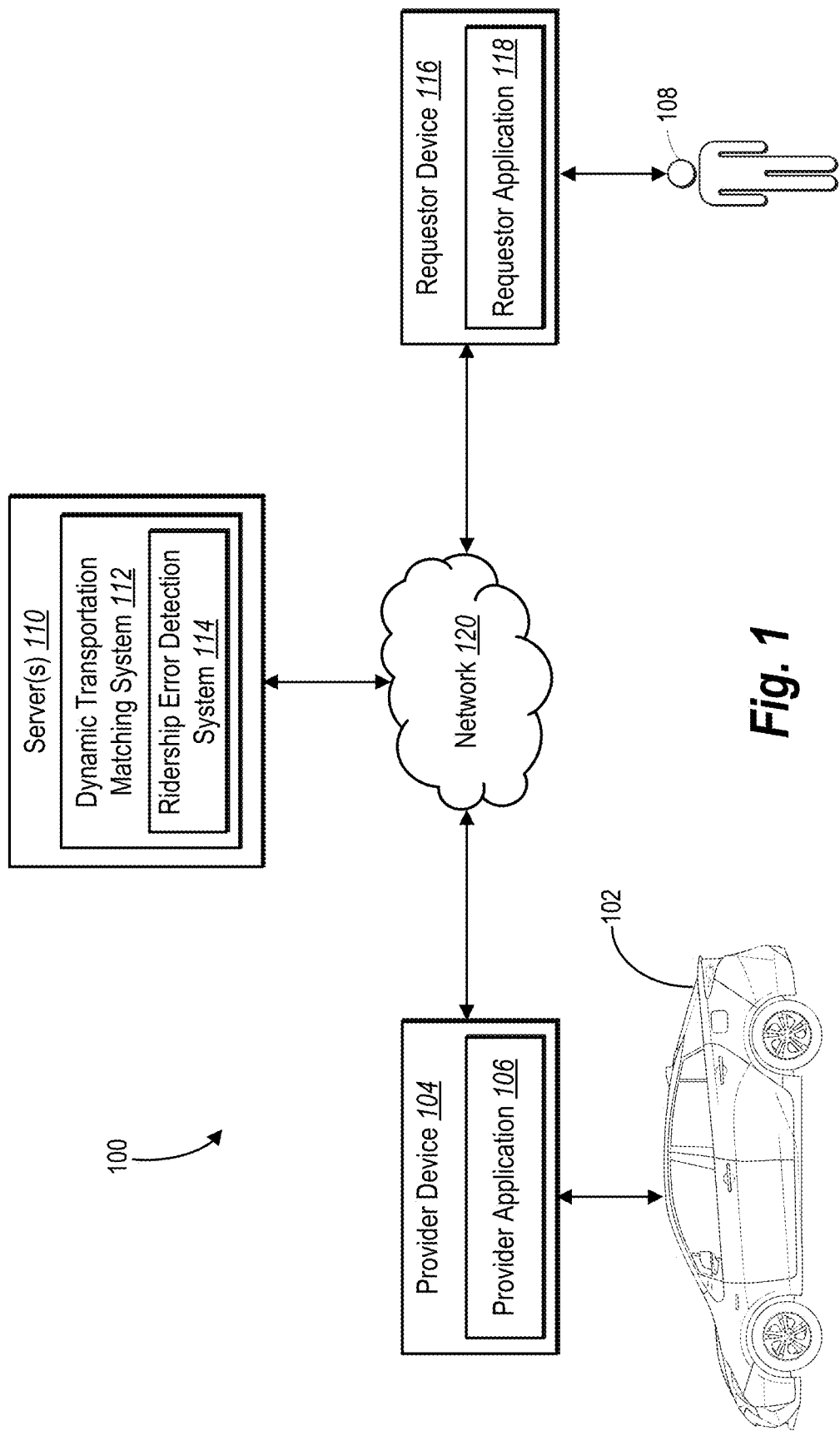
FIG. 1 illustrates an environment in which a ridership error detection system can operate in accordance with one or more embodiments.

This disclosure describes one or more embodiments of a ridership error detection system that flexibly analyzes various digital signals from provider devices and requestor devices across one or more ride stages to efficiently identify ridership errors. In particular, the ridership error detection system can determine a ridership error score indicating a probability that a requestor is in a correct vehicle, by analyzing various provider-requestor consistency signals across one or more ride stages. For instance, during approach stages, the ridership error detection system can utilize local wireless signals transmitted between provider devices and requestor devices to approximate distances between the provider device and the requestor device. Additionally, after a requestor has entered a vehicle, the ridership error detection system can monitor inertial measurement unit signals from provider devices and requestor devices to determine consistency of motion between the provider device and the requestor device. Furthermore, the ridership error detection system can monitor audio signals after a requestor has entered a vehicle to determine whether the requestor has entered the correct vehicle. By flexibly analyzing one or more signal types across one or more ride stages, the ridership error detection system can accurately and efficiently determine a ridership error score and notify corresponding requestor and provider devices.

To illustrate, in one or more embodiments, the ridership error detection system can identify a transportation match between a requestor device and a provider device. The ridership error detection system can determine, for a first ride stage, one or more distances between the requestor device and the provider device based on local wireless signals transmitted between the requestor device and the provider device. The ridership error detection system determines, for a second ride stage, Inertial Measurement Unit (IMU) signals indicating motion of at least one of the requestor device or the provider device. Additionally, the ridership error detection system can analyze the one or more distances determined based on the local wireless signals for the first ride stage and the IMU signals indicating the motion for the second ride stage to determine a ridership error score. Based on the ridership error score, the ridership error detection system provides a digital notification to at least one of the requestor device or the provider device.

As just mentioned, the ridership error detection system can access one or more sets of provider-requestor consistency signals from at least one of the requestor device or the provider device. For example, the ridership error detection system can identify local wireless signals, such as low-energy Bluetooth signals, between the requestor and provider devices to determine distances between a requestor device and a provider device. The ridership error detection system can utilize an IMU signal that reflects acceleration or movement of requestor devices and provider devices. Moreover, the ridership error detection system can determine audio signals, location signals, and other signals from the requestor device and the provider device.

By monitoring the various provider-requestor consistency signals, the ridership error detection system can determine a ridership error score and determine, with increased accuracy, whether the signals indicate a ridership error. For example, based on local wireless signals indicating distances between the provider device and the requestor device, the ridership error detection system can determine that a rider device and provider device are not within a threshold distance of each other, and therefore, a ridership error may exist. Similarly, based on IMU signals, the ridership error detection system can determine that a rider device is vibrating, accelerating, or moving in conjunction with a provider device and determine a ridership error score indicative of no ridership error. Moreover, the ridership error detection system can compare audio signals between provider and requestor devices, compare audio signals to voice signatures, identify names or locations from audio signals, and/or identify voice tones that reflect a ridership error. In addition, based on location data, the ridership error detection system can determine that a rider device and requestor device are not traveling together and a ridership error exists.

As mentioned, the ridership error detection system can also access and utilize one or more sets of provider-requestor consistency signals across one or more ride stages. For example, the ridership error detection system can detect a provider approach stage, a requestor approach stage, an open car door stage, a requestor enter stage, a close car door stage, a vehicle movement stage, or other ride stages. Moreover, the ridership error detection system can analyze one or more provider-requestor consistency signals across these one or more stages. For example, the ridership error detection system can analyze local wireless signals at early ride stages to determine the distance between the requestor and the provider. At a later ride stage in which the requestor has entered a vehicle, the ridership error detection system can compare motion (e.g., IMU) provider-requestor consistency signals of the requestor device and the provider device. Similarly, at a close car door stage, the ridership error detection system can analyze audio signals of the requestor device and the provider device (e.g., to detect the sound of the door closing from each device or to detect speakers, names, or destinations).

The ridership error detection system can utilize provider-requestor consistency signals for one or more ride stages to determine a ridership error confidence value. For example, the ridership error detection system can apply different weights to provider-requestor consistency signals to generate a ridership error confidence value that indicates the likelihood or confidence that a ridership error exists (e.g., that a rider has entered an incorrect vehicle). The ridership error detection system can utilize a variety of weighting approaches to determine that a ridership error exists, including machine learning models (e.g., neural networks) or regression analysis.

Additionally, the ridership error detection system can determine and execute various responses based on analyzing the one or more sets of provider-requestor consistency signals across one or more stages. For example, the ridership error detection system can surface various user interface options based on the one or more sets of provider-requestor consistency signals at one or more ride stages. At an early ride stage, the ridership error detection system can direct a requestor to the correct vehicle based on detected distances based on local wireless signals. Additionally, based on determining with high confidence that a ridership error does not exist between a vehicle utilized by the requestor and the provider, the ridership error detection system can send a confirmation notification to a requestor provider device and/or automatically start the ride. In contrast, based on detecting that a ridership error exists, the ridership error detection system can generate alerts at the requestor and provider devices to confirm provider or requestor identity, notify of ridership errors, provide options to send data to authorities, and other alerts.

As explained above, the ridership error detection system can provide numerous advantages, benefits, and practical applications relative to conventional systems. For instance, the ridership error detection system can improve accuracy relative to conventional systems. By analyzing one or more sets of provider-requestor consistency signals across one or more ride stages, the ridership error detection system can predict and prevent ridership errors. For example, in early ride stages before the requestor has entered the vehicle, the ridership error detection system can predict, by analyzing various provider-requestor consistency signals, a high likelihood that the requestor is approaching or has interacted with the wrong vehicle. The ridership error detection system can then send various alerts to the requestor to prevent the ridership error. Thus, ridership error detection system can make improvements to accuracy and security relative to conventional systems by dramatically reducing the number of ridership errors.

The ridership error detection system can also improve efficiency relative to conventional systems. For example, the ridership error detection system can avoid using time and computing resources utilized to transmit and compare matching information via requestors and providers. Moreover, the ridership error detection system can avoid the computational expense of gathering and analyzing GPS signals across all stages of a ride. Indeed, the ridership error detection system can intelligently identify and monitor particular sets of provider-requestor consistency signals at one or more ride stages to efficiently utilize resources to focus on accurate signals with regard to any particular stage.

In addition, the ridership error detection system can improve flexibility of operation relative to conventional systems. In particular, because the ridership error detection system accesses and analyzes diverse sets of provider-requestor consistency signals, the ridership error detection system can determine whether ridership errors exist with a high level of confidence in a variety of different circumstances. For example, the ridership error detection system can accurately determine ridership errors, even where GPS, cellular data, or any other specific data types are unavailable. Similarly, the ridership error detection system can determine ridership errors at various stages, including before a rider enters a vehicle, as a rider enters a vehicle, or during movement of the vehicle. Accordingly, the ridership error detection system can flexibly rely on whatever provider-requestor consistency signals are available to identify and correct ridership errors at various ride stages.

As illustrated by the foregoing discussion, the present disclosure utilizes a variety of terms to describe features and advantages of the ridership error detection system. Additional detail is now provided regarding these and other terms used herein. For example, as used herein, the term "requestor device" refers to a computing device associated with a requestor who requests a transportation request (via a dynamic transportation matching system). Typically, a requestor device includes a mobile device such as a laptop, smartphone, or tablet associated with a requestor. Requestor devices may comprise any type of computing device.

As used herein, the term "provider device" refers to a computing device associated with a transportation vehicle (e.g., a provider operating a transportation vehicle or an autonomous vehicle). Typically, a provider device includes a mobile device such as a laptop, smartphone, or tablet associated with a transportation vehicle. Provider devices may comprise any type of computing device including a display screen and/or a LED dot-matrix display element. Provider devices may include local devices affixed to the vehicle.

As used herein, the term "transportation match" refers to a correspondence between a requestor device and a provider device. In particular, a transportation match can include a selection of a provider device to fulfill a transportation request of a requestor device. In particular, the dynamic transportation matching system can receive a transportation request from a requestor device and identify an available provider device to complete a transportation match. For example, transportation match includes a pickup location, a destination location, and transportation matching system identifiers associated with the requestor device and the provider device. In some embodiments, the transportation match further comprises additional data including GPS location associated with the requestor device and provider device, a pickup time, and other preferences associated with the transportation match.

As used herein, the term "provider-requestor consistency signals" refers to digital information indicating a measure of consistency between a provider device or requestor device. In particular, provider-requestor consistency signals include digital information captured at provider devices, requestor devices, and the dynamic transportation matching system that indicate alignment of a provider device and requestor device of a transportation match. For example, provider-requestor consistency signals include local wireless signals, audio signals, telematic signals (e.g., Inertial Measurement Unit signals), location signals (e.g., GPS), and other types of signals.

As used herein, the term "local wireless signals" refers to data communication that is performed and delivered wirelessly within a particular area. The term "local wireless signals" refers to a type of provider-requestor consistency signal transmitted by a computing device (e.g., provider and/or requestor devices) and received by another computing device. For example, local wireless signals can include Wi-Fi signals, Bluetooth signals, ultra-wideband (UWB) signals, and other wireless beacons.

As used herein, the term "ride stages" refers to periods or events corresponding to a transportation ride. In particular, the term "ride stages" refers to periods marked by particular events within a trip or ride. For example, ride stages at the beginning of a ride can include a provider approach stage, a requestor approach stage, an open car door stage, a requestor enter stage, and other stages. Ride stages also refer to portions of a ride near the end of the ride (e.g., destination approach stage or vehicle exiting stage).

As used herein, the term "ridership error" refers to a mistake, inconsistency, or error in ridership that deviates from a transportation match. For example, ridership error can include instances where the requestor associated with the requestor device utilizes a vehicle other than the vehicle associated with the provider device included in the transportation match. Additionally, ridership error refers to scenarios in which a rider that is not associated with the requestor device in the transportation match enters a vehicle corresponding to the provider device.

As used herein, the term "ridership error score" refers to a score that indicates the likelihood of a ridership error. In particular, "ridership error score" can include a confidence score that a ridership error exists within a matched ride. For example, a ridership error score can comprise a numerical value (e.g., from 0-1) where higher values indicate a higher likelihood of a ridership error, and lower values indicate a lower likelihood of ridership error.

As used herein, the term "digital notification" refers to an electronic communication. In particular, a digital notification can include communications sent to computing devices to confirm ridership, start a ride, or indicate a ridership error. Digital notifications can include communications displayed or presented via computing devices such as a text, instant message, email, application notification (e.g., banner pop-up), audio call, or other type of message sent to a provider device or a requestor device that indicate whether or not a ridership error exists. Digital notifications include interactive notifications. Additionally, the term "digital notifications" can refer to communications sent to the requestor device and/or the provider device without presenting the communication on the requestor device and/or the provider device (e.g., an indicator that a ride has started or another digital communication).

Additional detail will now be provided regarding the ridership error detection system in relation to illustrative figures portraying example embodiments and implementations of the ridership error detection system. For example, FIG. 1 illustrates a schematic diagram of an environment 100 in which a ridership error detection system 114 can operate. As illustrated, the environment 100 includes one or more server(s) 110 connected to a provider device 104 and a requestor device 116 via a network 120 (examples of which will be described in more detail below with respect to FIG. 12). As illustrated, the provider device 104 is associated with a vehicle 102 and the requestor device 116 is associated with a requestor 108.

As shown, the environment 100 includes the server(s) 110. The server(s) 110 may generate, store, receive, and transmit various types of data including data relating to computing devices and transportation matches. The server(s) 110 receive data from a computing device, such as the requestor device 116, and send the data to another computing device, such as the provider device 104. Additionally, the server(s) 110 communicates with the requestor device 116 and the provider device 104. The server(s) 110 may comprise one or more server devices that implement the dynamic transportation matching system 112. The server(s) 110 may also comprise a communication server or a web-hosting server. Additional detail regarding the server(s) 110 will be discussed below with respect to FIG. 11.

In one or more embodiments, the server(s) 110 can include or implement all or a portion of a dynamic transportation matching system 112 and/or the ridership error detection system 114. Additional detail regarding the dynamic transportation matching system 112 is provided below in the discussion accompanying FIG. 13.

As mentioned previously, the dynamic transportation matching system 112 generates transportation matches by managing the distribution and allocation of transportation requests from requestor devices. For example, the dynamic transportation matching system 112 receives a transportation request from the requestor device 116. In at least one embodiment, a transportation request includes information such as the desired pickup location and destination location. The dynamic transportation matching system 112 matches the transportation request to an available provider device 104. The dynamic transportation matching system 112 sends, to the provider device 104, transportation match data including the pickup location, the destination location, and identification information for the requestor 108. Additionally, the dynamic transportation matching system 112 sends, to the requestor device 116, information identifying the vehicle 102 and other relevant transportation match information.

The dynamic transportation matching system 112 also monitors the progress of all matched rides through various ride stages. For example, the dynamic transportation matching system determines that a matched ride begins when the requestor 108 enters the vehicle 102 at the pickup location and ends when the requestor 108 leaves the vehicle at the destination location. The dynamic transportation matching system 112 detects matched ride stages based on communications received from the provider device 104 and/or the requestor device 116 indicating user input or an automatic detection that the requestor 108 has been picked up or dropped off.

As illustrated in FIG. 1, the environment 100 includes the ridership error detection system 114 as part of the dynamic transportation matching system 112. More specifically, the ridership error detection system 114 receives data from the dynamic transportation matching system 112 regarding a transportation match involving the requestor device 116 and the provider device 104. In some embodiments, the data comprises ride stages of the matched ride including whether the requestor 108, and/or the requestor device 116, has been picked up, if the matched ride is in progress (i.e., the requestor 108 is in the vehicle), a progress of the vehicle along the requested route, and when the requestor 108 has been dropped off at a destination location.

The ridership error detection system 114 detects whether a ridership errors exist. In particular, the ridership error detection system 114 identifies existing ridership errors when the requestor 108 enters a different vehicle than the vehicle 102 associated with the provider device 104 of the transportation match. The ridership error detection system 114 accesses information from the dynamic transportation matching system 112 to monitor ride stages of a matched ride. The ridership error detection system 114 receives one or more provider-requestor consistency signals from the provider device 104 and the requestor device 116 and analyzes the provider-requestor consistency signals to determine whether a ridership error exists. Based on the provider-requestor consistency signals, the ridership error detection system 114 determines a ridership error score. Based on the ridership error score, the ridership error detection system 114 may determine that the requestor 108 has entered an incorrect vehicle (i.e., a vehicle other than the vehicle 102). Additionally, the ridership error detection system 114 detects a ridership error when the wrong rider (i.e., a rider different than the requestor 108) enters the vehicle 102. The ridership error detection system 114 also sends notifications of a ridership error to the provider device 104 and/or the requestor device 116.

As shown, the environment 100 includes the requestor device 116. The requestor device 116 includes sensors to receive input from the requestor 108. The requestor device 116 collects, stores, and communicates data to the provider device 104 and the ridership error detection system 114. For example, the requestor device 116 includes various sensors that collect data including location data, local wireless signal data, IMU data, audio data, and other types of data. Additionally, the requestor device 116 may contain sensors including microphones, touch sensors, cameras, ambient sensors, identification sensors (e.g., fingerprint sensors and facial recognition), and other sensors. The requestor device 116 stores the data and sends the data to the ridership error detection system 114 and/or the provider device 104. Typically, the requestor device 116 comprises a mobile computing device such as a laptop, smartphone, or tablet associated with the requestor 108.

As illustrated in FIG. 1, the requestor device 116 includes a requestor application 118. In some embodiments, the requestor application 118 comprises a native or web-based application used for interacting with the dynamic transportation matching system 112. The requestor application 118 presents graphical user interfaces at the requestor device 116, receives input from the requestor, and communicates with the dynamic transportation matching system 112. The requestor application 118 compiles information to generate a transportation request. For example, the requestor application 118 may determine, either automatically or as input from the requestor 108, a pickup location and a destination or dropoff location. In at least one embodiment, the requestor application 118 provides a notification of a detected ridership error at the requestor device 116.

As illustrated in FIG. 1, the environment 100 includes the provider device 104. The provider device 104 is associated with the vehicle 102. Typically, the provider device 104 and the vehicle 102 are both operated by a provider. The provider device 104 collects, stores, and communicates data to the requestor device 116 and the ridership error detection system 114. Similar to the requestor device 116, the provider device 104 collects location data, local wireless signal data, IMU data, audio, and other types of data. The provider device 104 stores the data and sends the data to the ridership error detection system 114 and/or the requestor device 116. Although FIG. 1 illustrates a single provider device 104, the environment 100 may also include additional provider devices 104 that communicate with each other. For example, the provider device 104 may represent a traditional mobile device in addition to a provider communication device that is configured to easily and efficiently display information to a provider and/or the requestor 108.

The provider device 104 includes a provider application 106. The provider application 106 presents relevant transportation match information via the provider device 104. For example, the provider application 106 can present notifications of ridership error. Additionally, in some embodiments, the provider application 106 receives input from the provider that operates the vehicle 102.

As illustrated in FIG. 1, the provider device 104 is associated with the vehicle 102. In certain embodiments, the vehicle 102 is operated by a provider (i.e., a person who drives the vehicle 102). In certain other embodiments, the vehicle 102 is not associated with a provider but rather includes an autonomous transportation vehicle such as a self-driving vehicle that includes computer components and accompanying sensors for driving without manual input from a human provider. When the vehicle 102 comprises an autonomous vehicle, the vehicle 102 may include additional components not depicted in FIG. 1 such as location components, one or more sensors by which the autonomous vehicle navigates, and/or other components necessary to navigate without a human provider (or with minimal interactions from a provider).

Although FIG. 1 illustrates a particular arrangement of the provider device 104, the server(s) 110, and the requestor device 116, various additional arrangements are possible. For example, the requestor device 116 and the provider device 104 may directly communicate with the server(s) 110, bypassing the network 120. Additionally, the requestor device 116 and the provider device 104 may directly communicate with each other.

Similarly, although the environment 100 of FIG. 1 is depicted as having various components, the environment 100 may have additional or alternative components. For example, the ridership error detection system 114 can be implemented on a single computing device within the environment 100. In particular, the ridership error detection system 114 may be implemented in whole or in part on the provider device 104 or the requestor device 116. Additionally, various alternative implementations are possible. For instance, the ridership error detection system 114 may be implemented separately among the provider device 104, the requestor device 116, and the network 120.

As mentioned, the ridership error detection system 114 provides a digital notification based on whether a ridership error exists. FIG. 2 illustrates a general overview of how the ridership error detection system 114 provides a digital notification based on determining whether a ridership error exists by analyzing one or more provider-requestor signals across one or more ride stages. In particular, FIG. 2 illustrates a series of acts 200 including an act 202 of identifying one or more sets of provider-requestor signals across one or more ride stages, an act 204 of determining a ridership error score, and an act 206 of providing a digital notification.

As illustrated in FIG. 2, the series of acts 200 includes the act 202 of identifying one or more sets of provider-requestor consistency signals across one or more ride stages. The ridership error detection system 114 identifies distinct ride stages during a matched ride. As illustrated, the one or more ride stages can include a provider approach stage 210, a requestor approach stage 212, an open car door stage 214, a requestor enter stage 216, a close car door stage 218, and a vehicle movement stage 220. Additional detail regarding one or more ride stages is provided below (e.g., in relation to FIG. 3). FIG. 2 illustrates example ride stages in one embodiment of the ridership error detection system 114. In other embodiments, the ridership error detection system 114 recognizes other ride stages (e.g., pre-entry ride stage, a pre-movement ride stage, and a post-movement ride stage).

As further illustrated in FIG. 2, as part of the act 202, the ridership error detection system 114 identifies one or more sets of provider-requestor consistency signals across the ride stages. Provider-requestor consistency signals can vary as a matched ride progresses through ride stages. In particular, the ridership error detection system 114 determines that some provider-requestor consistency signals are more likely to indicate ridership errors at specific ride stages. For example, a mismatch between audio signals from the provider device 104 and the requestor device 116 while the requestor device 116 is within the vehicle 102 might indicate a ridership error. In at least one embodiment, the ridership error detection system 114 accesses a particular set of provider-requestor consistency signals at a first ride stage and a second set of provider-requestor consistency signals at a second ride stage. In at least one embodiment, the ridership error detection system 114 applies different weights to the sets of provider-requestor consistency signals based on the ride stages at which the ridership error detection system 114 accesses the provider-requestor consistency signals.

In at least one embodiment, as part of the act 202, the ridership error detection system 114 determines, for a first ride stage, one or more distances between the requestor device and the provider device based on local wireless signals transmitted between the requestor device and the provider device. For example, during the requestor approach stage, the ridership error detection system 114 analyzes local wireless signals. During a following ride stage, the ridership error detection system 114 analyzes IMU signals. For example, and as illustrated, during the requestor enter stage 216, the ridership error detection system 114 determines IMU signals indicating motion for the provider device 104 and the requestor device 116.

In at least one embodiment, the ridership error detection system 114 begins to analyze sets of provider-requestor consistency signals based on the analysis of provider-requestor consistency signals at a previous ride stage. For instance, the ridership error detection system 114 analyzes distances determined based on local wireless signals and IMU signals at the requestor approach stage. Based on determining that the local wireless signals and the IMU signals indicate that the requestor device 116 is in close proximity to the vehicle 102, the ridership error detection system 114 determines to begin analyzing audio signals to identify the sound of an opening car door and/or voices in anticipation of the open car door stage.

Moreover, in some embodiments, the ridership error detection system 114 simultaneously stops analyzing the set of provider-requestor consistency signals associated with the previous ride stage at the same time as the ridership error detection system 114 begins analyzing a second set of provider-requestor consistency signals associated with the current ride stage. For example, based on detecting the beginning of the open car door stage 214 (e.g., based on local wireless signals or a vehicle alert of an open car door), the ridership error detection system 114 may stop analyzing local wireless signals and IMU signals and instead begin analyzing audio signals. In at least one other embodiment, the ridership error detection system 114 continues to monitor the set of provider-requestor consistency signals from the previous ride stage for a threshold amount of time after detecting a new ride stage. For example, upon detecting the beginning of the close car door stage 218, the ridership error detection system 114 can continue monitoring the local wireless signals and the IMU signals associated with the previous requestor enter stage 216 for a threshold amount of time (e.g., 30 seconds, 1 minute, etc.).

Further, in at least one embodiment, the ridership error detection system 114 begins analyzing all or a greater portion of the provider-requestor consistency signals based on predicting that a ridership error may exist. In particular, based on detecting irregularities or inconsistencies in provider-requestor consistency signals within a ride stage, the ridership error detection system 114 begins analyzing additional provider-requestor consistency signals to determine, with greater confidence, whether a ridership error exists. For example, based on location signals and local wireless signals analyzed during the provider approach stage 210, the ridership error detection system 114 determines that both the provider device 104 and the requestor device 116 are in proximity to the pickup location. Based on anticipating the requestor approach stage 212, the ridership error detection system 114 begins analyzing local wireless signals and IMU signals. However, if the ridership error detection system 114 determines that a ridership error may exist based on local wireless signals (e.g., the requestor device 116 does not approach an area immediately surrounding the vehicle 102), the ridership error detection system 114 begins analyzing a greater portion of the provider-requestor consistency signals.

Additionally, the ridership error detection system 114 may analyze a majority or all sets of provider-requestor consistency signals across the ride stages based on a user-selected heightened security setting. For example, the ridership error detection system 114 provides, via the requestor device 116 and/or the provider device 104, a user interface with a selectable element for selecting a heightened security setting (e.g., toggling on or off). Based on a user selection of a heightened security setting, the ridership error detection system 114 analyzes additional provider-requestor consistency signals across the ride stages. For example, the ridership error detection system 114 may determine to analyze all (or a greater number of) provider-requestor consistency signals for the duration of the matched ride.

The ridership error detection system 114 may also analyze more provider-requestor consistency signals based on auto-detecting the conditions of a busy location. For example, if the ridership error detection system 114 detects, based on a high concentration of pickup locations within a single area, the ridership error detection system 114 may require a higher ridership error score to determine whether a ridership error exists and therefore analyze more provider-requestor consistency signals.

FIG. 2 illustrates specific sets of provider-requestor consistency signals associated with particular rider stages in at least one embodiment. Generally, the ridership error detection system 114 accesses provider-requestor consistency signals from the requestor device 116 and/or the provider device 104 including local wireless signals, audio signals, IMU signals, and location signals. Each of these provider-requestor consistency signals will be discussed in additional detail below (e.g., in relation to FIGS. 4A-7B).

By way of example, as illustrated in FIG. 2, the ridership error detection system 114 identifies location signals and local wireless signals during the provider approach stage 210. As mentioned previously, in at least one embodiment, the ridership error detection system 114 accesses the location signals and local wireless signals without accessing other types of provider-requestor consistency signals during the provider approach stage 210. In at least one other embodiment, the ridership error detection system 114 accesses all provider-requestor consistency signals in addition to the location signals and local wireless signals and applies more weight to the location signals and local wireless signals during the provider approach stage 210. FIG. 2 illustrates an example embodiment of sets of provider-requestor consistency signals linked to specific ride stages. In one or more other embodiments, the ridership error detection system 114 identifies one or more sets of provider-requestor consistency signals with the ride stages.

Although FIG. 2 illustrates an example embodiment of the ridership error detection system 114 accessing particular provider-requestor consistency signals at the various ride stages, the ridership error detection system 114 accesses one or more provider-requestor consistency signals than those illustrated at each ride stage in various other embodiments. For example, at the provider approach stage 210, the ridership error detection system 114 can analyze at least one of location signals, local wireless signals, and IMU signals. At the requestor approach stage 212, the ridership error detection system 114 can access at least one of location signals, local wireless signals, and IMU signals. At the open car door stage 214, the ridership error detection system 114 may access location signals, local wireless signals, IMU signals, and audio signals. At the requestor enter stage 216, the ridership error detection system 114 may access one or any combination of location signals, local wireless signals, IMU signals, and audio signals. During the close car door stage 218, the ridership error detection system 114 may access location signals, local wireless signals, IMU signals, and/or audio signals. During the vehicle movement stage 220, the ridership error detection system 114 may access one or more of the local wireless signals, IMU signals, audio signals, and/or location signals. The present ridership error detection system 114 can utilize any combination of these signals at one or more ride stages.

Furthermore, the ridership error detection system 114 may, at various ride stages, access a one or more sets of signals from the provider device 104 and the requestor device 116. For example, in at least one embodiment, the ridership error detection system 114 accesses location signals from the provider device 104 but not from the requestor device 116 during the provider approach stage 210. Additionally, during the requestor enter stage 216, the ridership error detection system 114 may access IMU signals from the requestor device 116 but not from the provider device 104.

As illustrated, the ridership error detection system 114 performs the act 204 of determining a ridership error score. The ridership error score may indicate the presence or absence of a ridership error (e.g., if the ridership error score satisfies a ridership error threshold). The ridership error detection system 114 analyzes the provider-requestor consistency signals from the provider device 104 and/or the requestor device 116. More specifically, the ridership error detection system 114 analyzes signals from the requestor device 116 and signals received from the provider device 104 to determine a ridership error score and whether the signals and the combination of provider-requestor consistency signals are indicative of a ridership error. The ridership error detection system 114 can compare signals from the provider device 104 and the requestor device 116. For example, the ridership error detection system 114, based on determining that the location signals of the provider device 104 do not match the location signals from the requestor device 116, may determine a higher likelihood of a ridership error. In comparison, based on determining that the location signals of the provider device 104 and the requestor device 116 meet a similarity threshold, the ridership error detection system 114 determines ridership error score indicating a low probability of ridership error. Additionally, the ridership error detection system 114 can compare signals from the provider device 104 and the requestor device 116 with historical data to determine the likelihood of ridership error.

As part of the act 204 of determining a ridership error score, the ridership error detection system 114, the ridership error detection system 114 generates a confidence score associated with the ridership error determination. In at least one embodiment, the ridership error detection system 114 generates the confidence score based on the number of signal sources that reflect mismatches and matches. In another embodiment, based on determining that the confidence level of a provider-consistency signal meets a certain threshold, the ridership error detection system 114 automatically determines whether the ridership error exists. Additionally, if the ridership error detection system 114 determines a particularly low confidence score the ridership error detection system 114 analyzes additional provider-requestor consistency signals to increase the confidence level.

The ridership error detection system 114 generates the confidence score by applying weights to the one or more provider-requestor signals across the ride stages. In at least one embodiment, the ridership error detection system 114 applies different weights to one or more signals. For example, the ridership error detection system 114 can assign a greater weight to distances determined based on local wireless signals than to IMU signals and audio signals. Additionally, the ridership error detection system 114 can apply weights to signals based on the ride stage. For example, the ridership error detection system 114 can apply greater weight to audio signals at the open car door stage, the requestor enter stage, and the close car door stage than in other stages. Additionally or alternatively, the ridership error detection system 114 can apply weights to the one or more provider-requestor consistency signals by utilizing a heuristic rule-based model, a regression model, and/or other methods.

Furthermore, the ridership error detection system 114 can utilize a trained neural network to generate confidence scores based on analyzing the provider-requestor consistency signals. The ridership error detection system 114 can train the neural network utilizing inputting training provider-requestor consistency signals and ground truth ridership error metrics. Additional detail regarding training a neural network to generate confidence scores and predict ridership errors is provided below (e.g., in relation to FIG. 9).

Though not illustrated in FIG. 2, in addition to determining a ridership error score, the ridership error detection system 114 may also identify the existence or lack of additional errors. For example, the ridership error detection system 114 determines whether material (e.g., the requestor device 116, a purse, etc.) has been left in the vehicle 102. In particular, the ridership error detection system 114 continues to analyze the provider-requestor consistency signals as the matched ride ends to determine whether material has been left in the vehicle 102. For instance, the ridership error detection system 114 determines that matching audio signals, IMU signals, and location signals from the provider device 104 and the requestor device 116 after the matched ride has ended (e.g., after dropoff) is linked to a high likelihood that the requestor device 116 is within the vehicle 102 after dropoff. Additionally, as will be discussed below in relation to FIGS. 5A-5B, the ridership error detection system 114 may analyze echolocation signals (e.g., audio signals) from the provider device 104 to determine whether material has been left in the vehicle 102 after the requestor 108 has left the vehicle 102.

As illustrated in FIG. 2, the ridership error detection system 114 performs the act 206 of providing a digital notification. The ridership error detection system 114 provides notifications to the requestor device 116 and/or the provider device 104 when the ridership error detection system 114 determines, with a high confidence score, that there is no ridership error. For example, the ridership error detection system 114 may automatically begin the matched ride and send a notification indicating that the matched ride has begun. Additionally, the ridership error detection system 114 provides digital notifications to the requestor device 116 and/or the provider device 104 in cases where the ridership error detection system 114 detects a ridership error. For example, the ridership error detection system 114 can provide, to the requestor device 116, an interactive digital message including information about the potential ridership error. In at least one embodiment, the ridership error detection system 114 sends a digital push notification to the requestor device 116.

Figure 3:
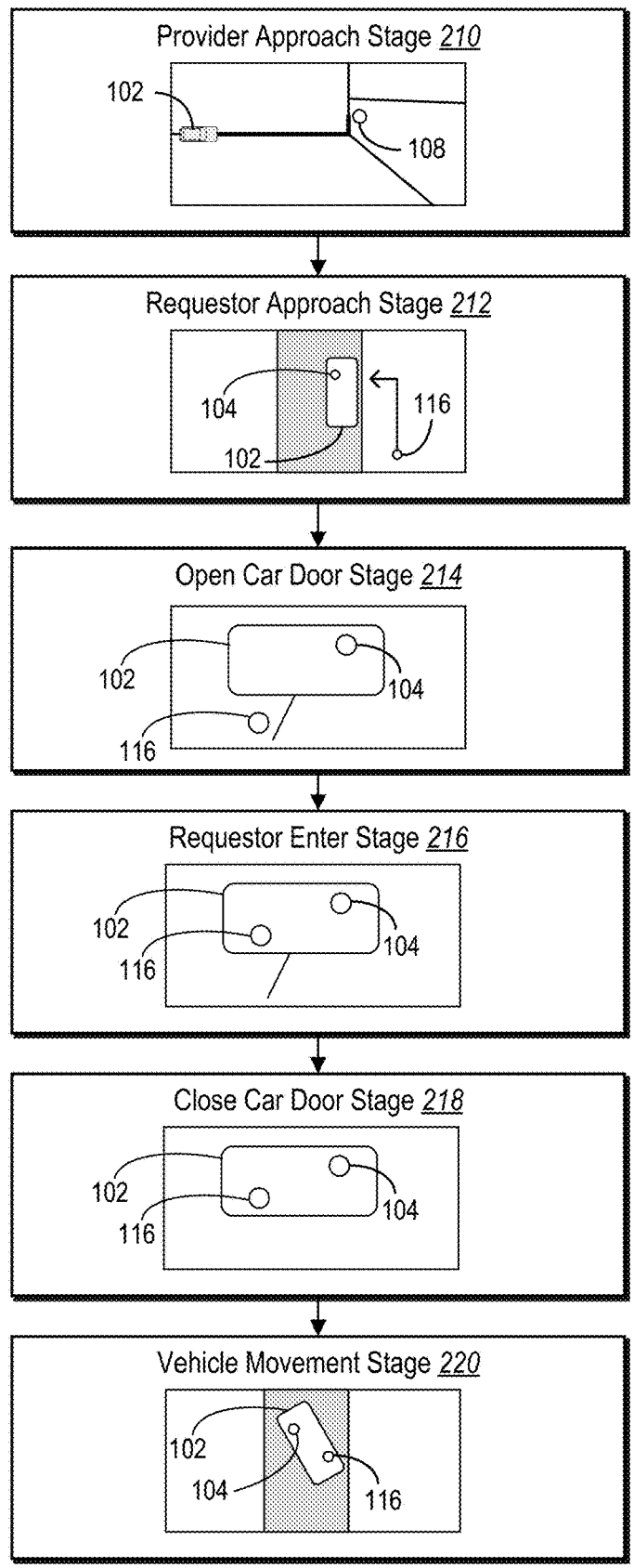
FIG. 3 illustrates example ride stages in accordance with one or more embodiments.

FIG. 2 provides a general overview for using one or more sets of provider-requestor consistency signals across ride stages to determine a ridership error score. FIG. 3 provides an overview of the various ride stages mentioned above in reference to FIG. 2. FIG. 3 illustrates the provider approach stage 210, the requestor approach stage 212, the open car door stage 214, the requestor enter stage 216, the close car door stage 218, and the vehicle movement stage 220. FIG. 3 illustrates an example embodiment of ride stages; however, in other embodiments, the ridership error detection system 114 can identify one or more ride stages. For example, the ridership error detection system 114 can combine the illustrated ride stages to have fewer ride stages overall or expand the ride stages to identify more ride stages. Additionally, the ridership error detection system 114 can also define one or more ride stages using different characteristics.

In at least one embodiment, the ridership error detection system 114 utilizes signals received from the provider device 104 and the requestor device 116 to identify ride stages. For instance, during a particular ride stage, the ridership error detection system 114 analyzes the set of identified provider-requestor consistency signals corresponding to the particular ride stage. Based on identifying a particular characteristic or trigger event within the provider-requestor consistency signals, the ridership error detection system 114 accesses or assigns a greater weight to the next set of provider-requestor consistency signals.

FIG. 3 illustrates the provider approach stage 210. As illustrated, the provider approach stage 210 begins after the dynamic transportation matching system 112 determines the transportation match involving the provider device 104 and the requestor device 116. During the provider approach stage 210, the vehicle 102 (along with the provider device 104) and the requestor 108 move toward the pickup location. The provider approach stage 210 ends when the vehicle 102 and the provider device 104 stop at the pickup location. As illustrated in FIG. 2, the ridership error detection system 114 accesses location signals and local wireless signals from both devices during the provider approach stage 210.

As illustrated in FIG. 3, the requestor approach stage 212 begins when the provider device 104 stops at the pickup location and the requestor device 116 approaches the provider device 104. The requestor approach stage 212 ends when both the provider device 104 and the requestor device 116 arrive at the pickup location. In at least one embodiment, during the requestor approach stage 212, the ridership error detection system 114 accesses local wireless signals and IMU signals.

The ridership error detection system 114 defines the open car door stage 214 as the stage when both the requestor device 116 and the provider device 104 have arrived at the pickup location and the ridership error detection system 114 detects that a door of the vehicle 102 is open. For example, the ridership error detection system 114 can determine that the car door is opened based on audio signals received from the provider device 104 and the requestor device 116. Additionally, in at least one embodiment, the ridership error detection system 114 accesses signals from the vehicle 102 that indicate whether a door is open and which door is open.

As shown in FIG. 3, during the requestor enter stage 216, the requestor device 116 enters the vehicle 102. During this stage, the ridership error detection system 114 may identify local wireless signals and IMU signals. For instance, the ridership error detection system 114 determines the distance between the provider device 104 and the requestor device 116 using the local wireless signals. Furthermore, the ridership error detection system 114 detects movement of the requestor device 116 as the requestor device 116 enters the vehicle 102.

During the close car door stage 218, the provider device 104 and the requestor device 116 are in close proximity while the door of the vehicle 102 is closed. As with the open car door stage 214, the ridership error detection system 114 can access signals from the vehicle 102 that indicate that the door of the vehicle 102 is closed. At the close car door stage 218, the ridership error detection system 114 can determine whether both the requestor device 116 and the provider device 104 register the sound of the closing door by analyzing audio signals.

At the vehicle movement stage 220 illustrated in FIG. 3, the vehicle 102 begins moving. In particular, the provider device 104 and the requestor device 116 are both in close proximity and begin movement. The vehicle movement stage 220 also signals the beginning of the matched ride. In at least some embodiments, based on determining, with a high confidence, that a ridership error does not exist, the ridership error detection system 114 can automatically begin the matched ride at the vehicle movement stage 220. As illustrated in FIG. 2, the ridership error detection system 114 may identify local wireless signals, IMU signals, and location signals from the requestor device 116 and the provider device 104.

Figure 4A:
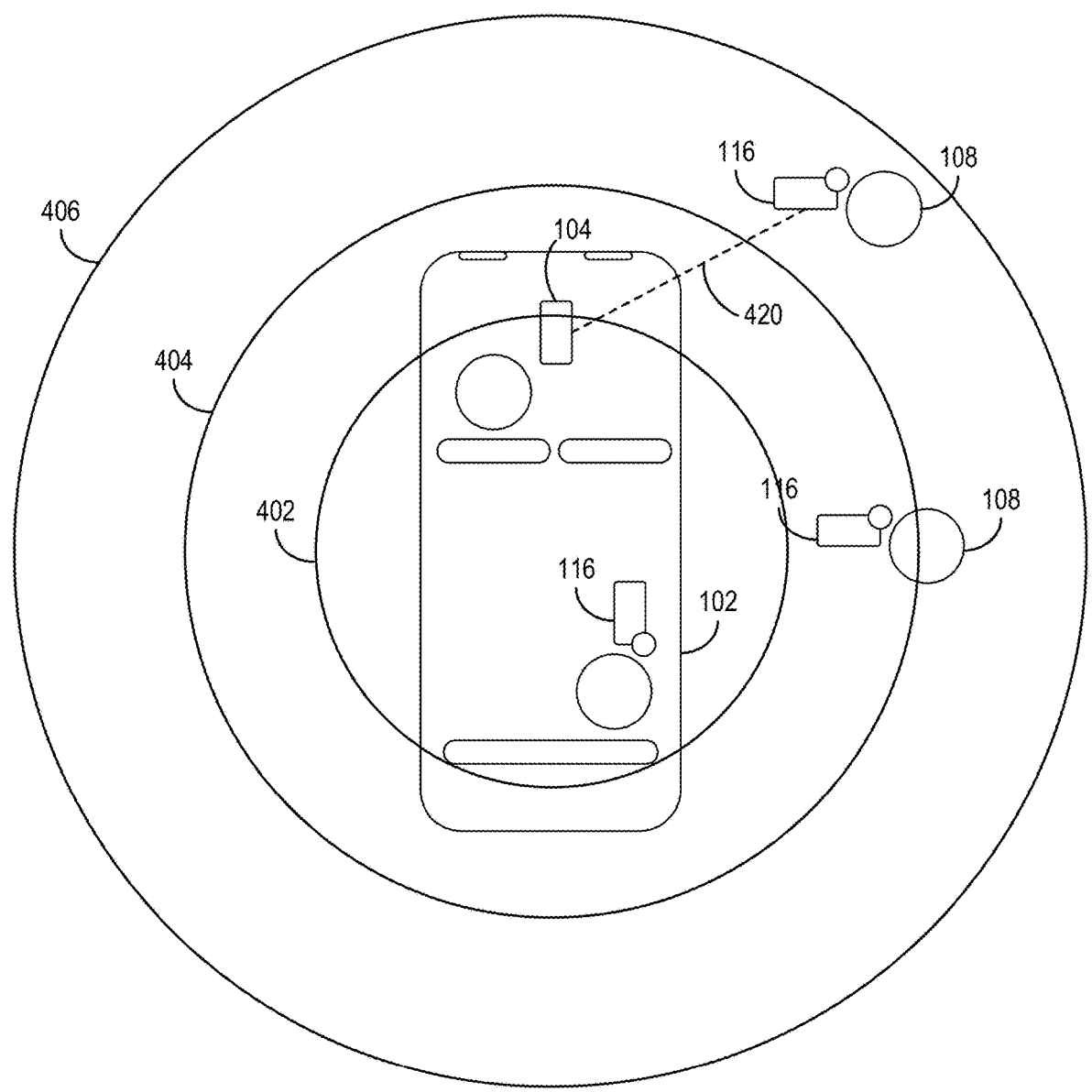
Figure 5A:
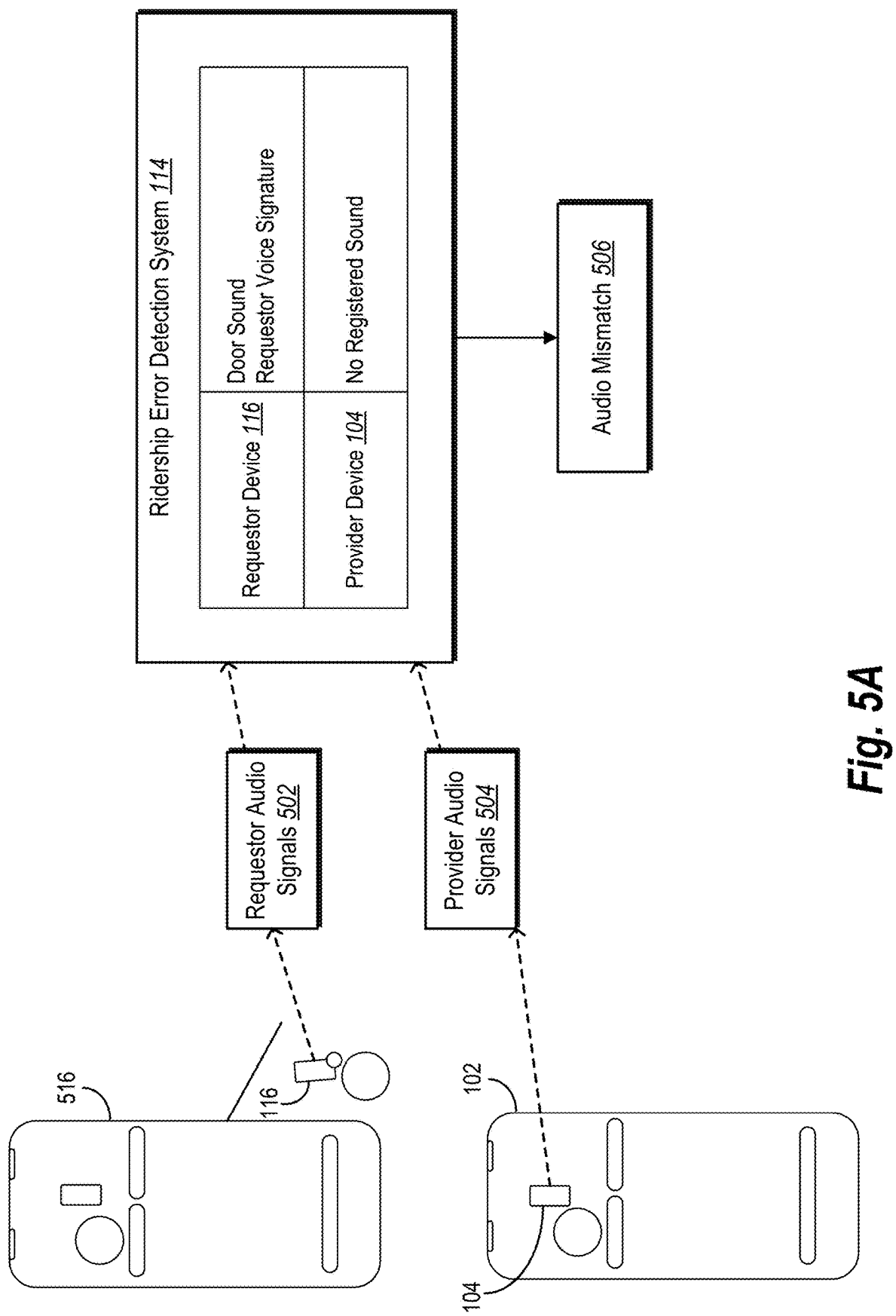
FIGS. 5A-5B illustrate utilizing audio signals to determine ridership errors in accordance with one or more embodiments.
Figure 5B:
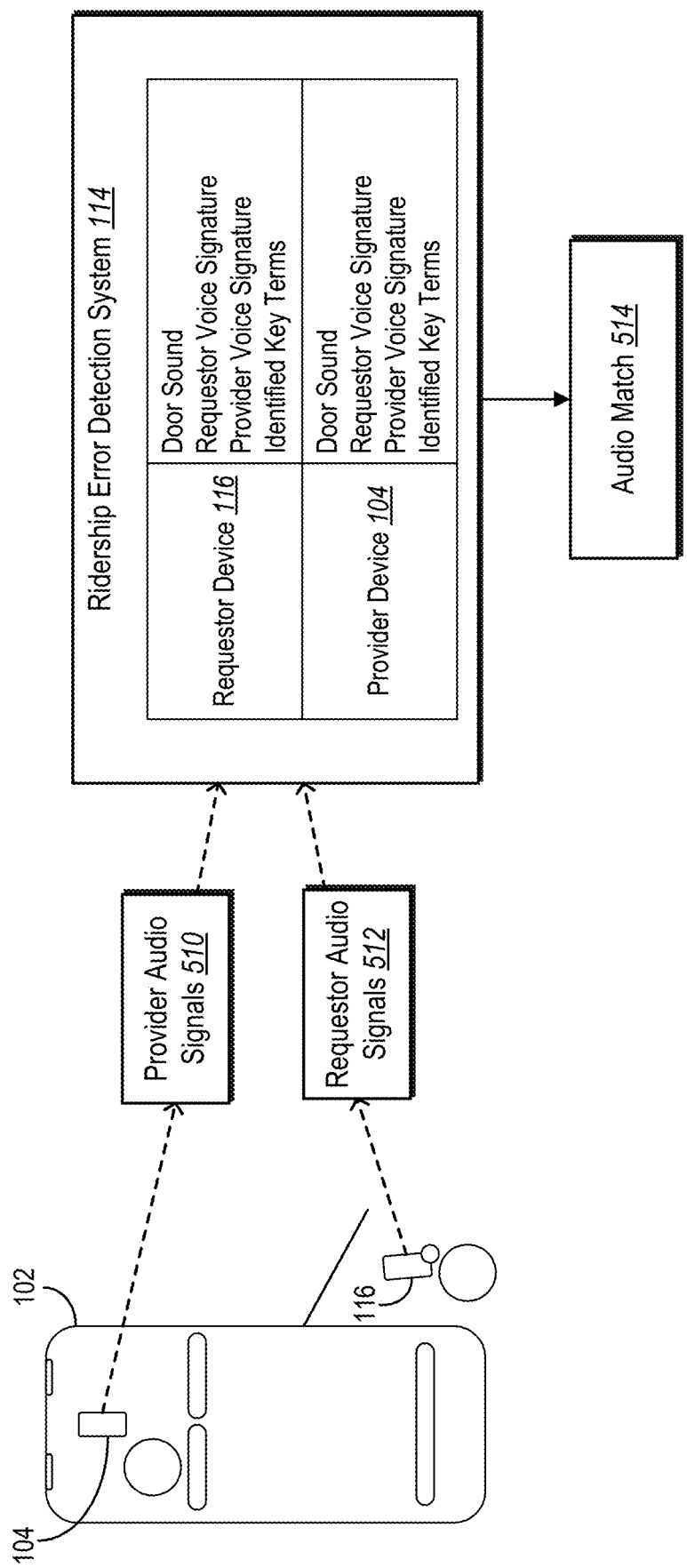
Figure 6A:
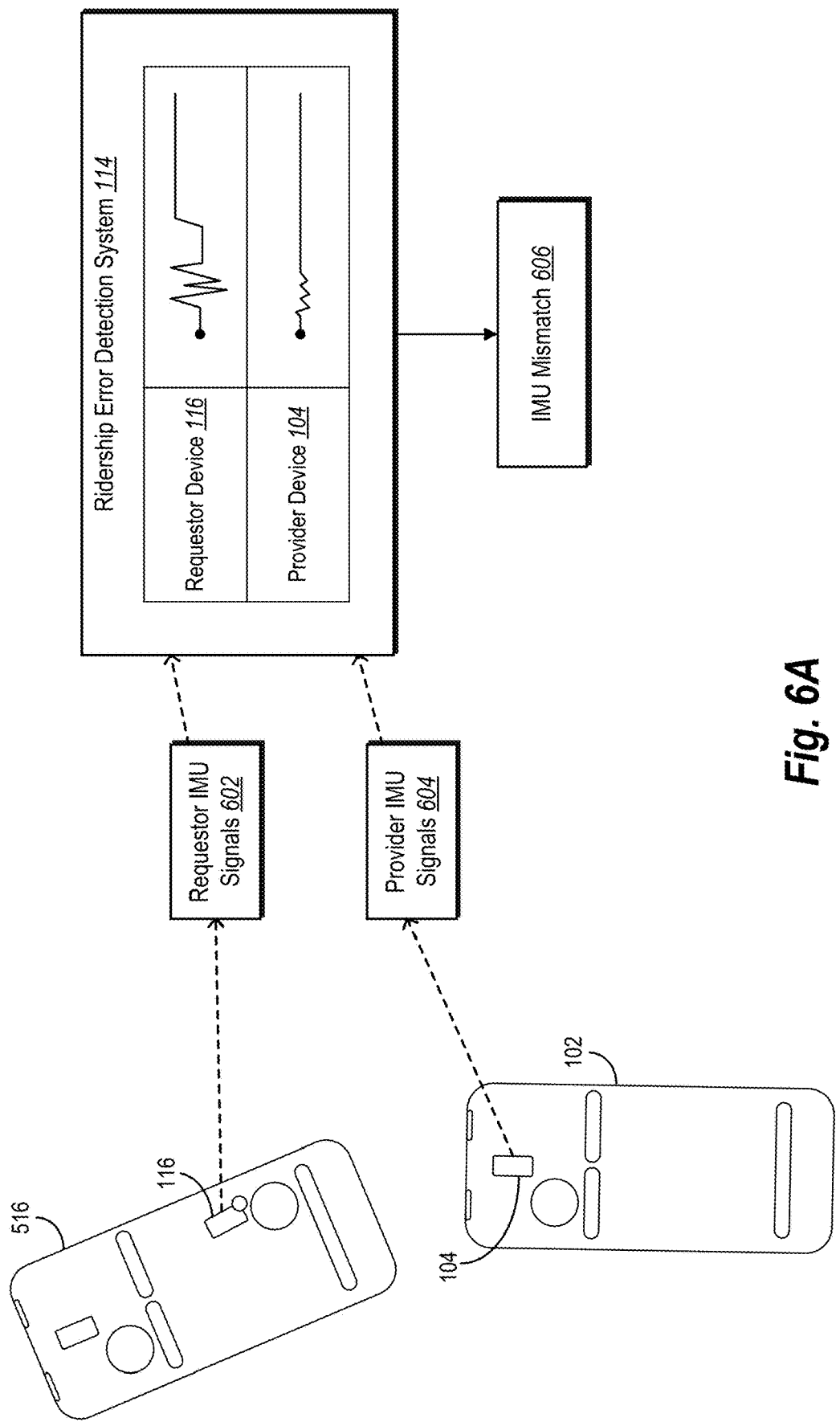
FIGS. 6A-6B illustrate utilizing IMU signals to determine ridership errors in accordance with one or more embodiments.
Figure 6B:
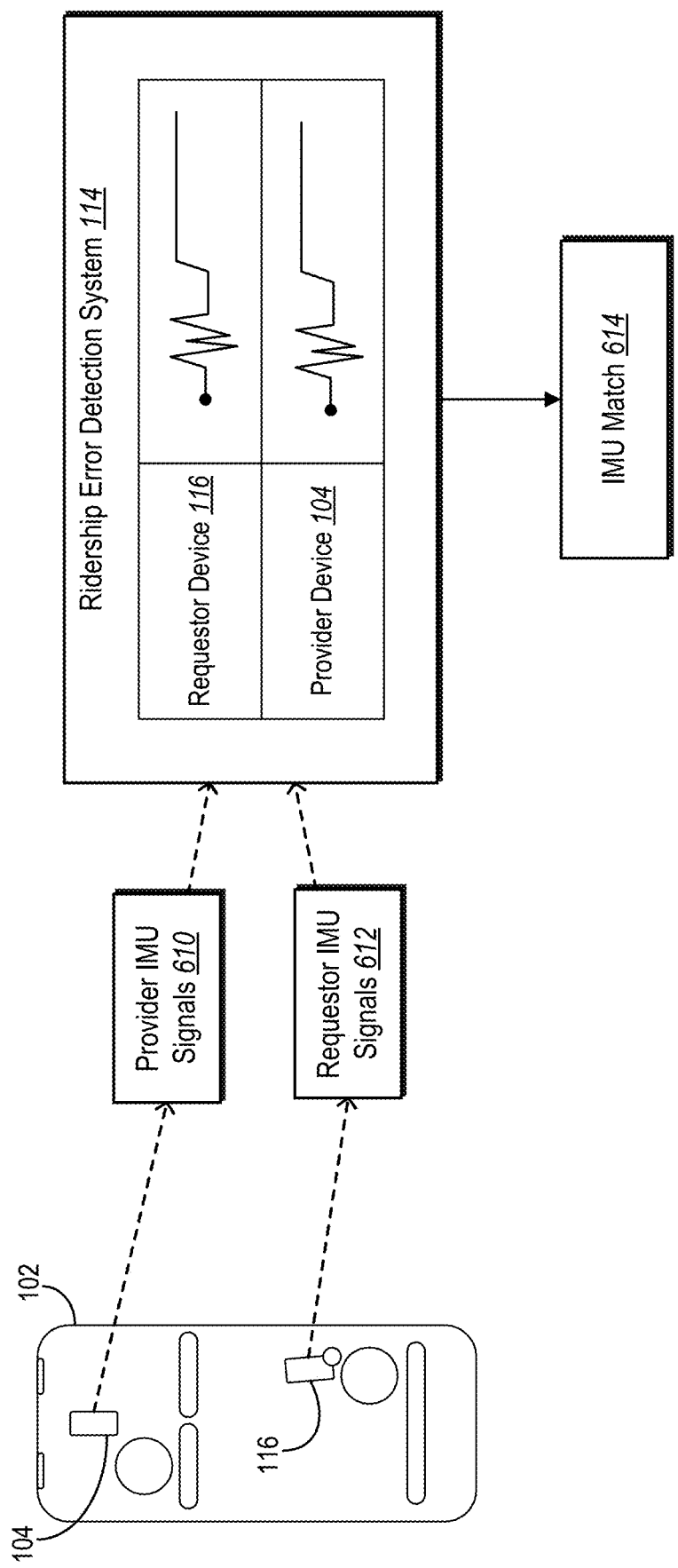
Figure 7A:
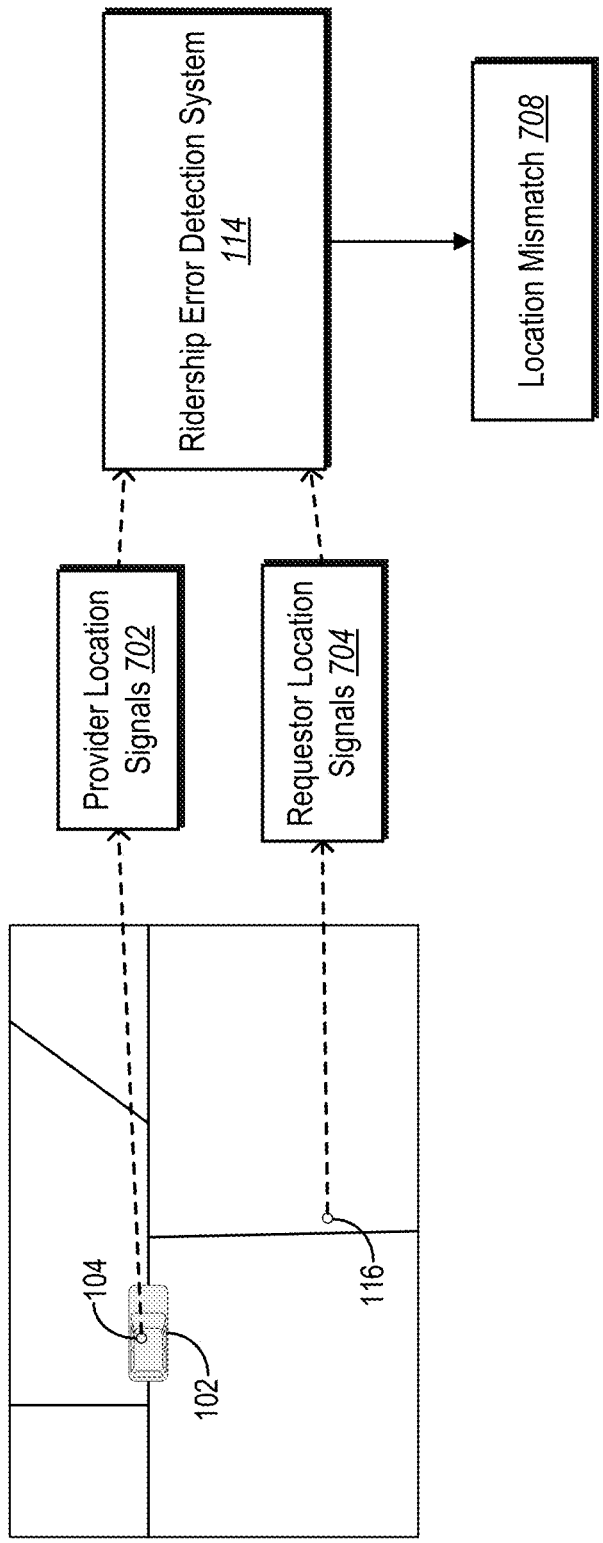
FIGS. 7A-7B illustrate utilizing location signals to determine ridership errors in accordance with one or more embodiments.
Figure 7B:
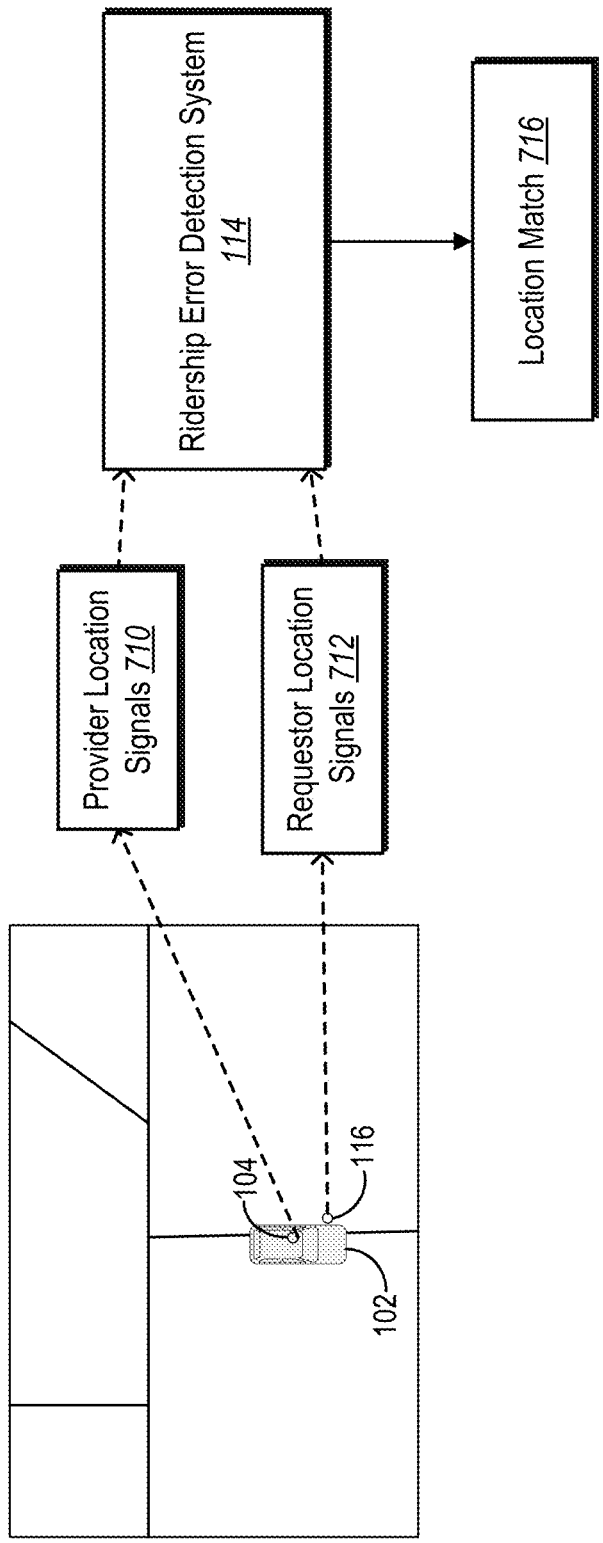

FIG. 3 provides an overview of ride stages of a matched ride. As mentioned previously, the ridership error detection system 114 identifies one or more sets of provider-requestor consistency signals across ride stages. The following figures and accompanying discussion provide additional detail with respect to provider-requestor consistency signals. FIGS. 4A-4B and the accompanying discussion provide additional detail regarding local wireless signals. FIGS. 5A-5B and the accompanying discussion provide additional detail regarding audio signals. FIGS. 6A-6B and the accompanying discussion provide additional detail regarding IMU signals. FIGS. 7A-7B and the accompanying discussion provide additional detail regarding location signals.

As mentioned, FIGS. 4A-4B illustrate how the ridership error detection system 114 utilizes local wireless signals to determine a distance between the requestor device 116 and the provider device 104. FIG. 4A illustrates how the requestor device 116 and the provider device 104 transmit local wireless signals 420. In particular, FIG. 4A illustrates an immediate signal strength area 402, a near signal strength area 404, and a far signal strength area 406.

Generally, the ridership error detection system 114 utilizes local wireless signals 420 (e.g., a low-energy Bluetooth signals forming a Bluetooth beacon) to determine distances between transmitting devices and scanning devices. As mentioned previously, the local wireless signals 420 can include low-energy Bluetooth signals forming Bluetooth beacons, Wi-fi signals, UWB signals, and other wireless beacons. In at least one embodiment, the transmitting devices send the local wireless signals 420 to scanning devices via a wireless communication link (e.g., a Bluetooth paired link). In particular, the transmitting devices and the scanning devices automatically establish the wireless communication link once the devices are within a threshold proximity, such as a threshold distance, of each other. In other embodiments, the transmitting devices emit the local wireless signals 420, and the scanning devices detect the local wireless signals 420 once the devices are within a threshold range of each other without establishing a wireless communication link. The scanning devices receive the local wireless signals 420, and the ridership error detection system 114 determines the signal strength to determine a distance, such as a threshold distance, between a transmitting device and a scanning device.

In at least one embodiment, the ridership error detection system 114 determines whether the local wireless signal capabilities of the provider device 104 and the requestor device 116 are enabled, functional, and compatible. For example, the ridership error detection system 114 determines what types of local wireless signal capabilities are enabled on the provider device 104 and the requestor device 116. Additionally, the ridership error detection system 114 accesses the local wireless signals 420 in accordance with permissions set at the respective devices. The ridership error detection system 114 further determines whether the provider device 104 and the requestor device 116 are enabled to send and receive compatible types of local wireless signals.

FIG. 4A and the accompanying discussion describe an embodiment in which the provider device 104 sends the local wireless signals 420 as the transmitting device and the requestor device 116 detects the local wireless signals 420 as the scanning device. However, though not illustrated, in other embodiments, both the requestor device 116 and the provider device 104 transmit and scan for the local wireless signals 420. For example, in some embodiments, the ridership error detection system 114 causes the requestor device 116 to emit the local wireless signals 420 when the requestor application 118 is open on the requestor device 116. Additionally, in some embodiments, the requestor device 116 emits the local wireless signals 420 while the provider device 104 detects the local wireless signals 420 as the scanning device.

As illustrated in FIG. 4A, the ridership error detection system 114 determines a distance between the requestor device 116 and the provider device 104, and thus a location of the requestor device 116 relative to the vehicle 102. Generally, the ridership error detection system 114 associates stronger signals of the local wireless signals 420 with shorter distances between the provider device 104 and the requestor device 116. The ridership error detection system 114 determines that the provider device 104 and the requestor device 116 are within distance ranges of each other depending on the signal strength. If the ridership error detection system 114 determines that the requestor device 116 is out of the threshold range to detect the local wireless signals 420 (i.e., the local wireless signals 420 are not found), the ridership error detection system 114 determines that the requestor device 116 is beyond the far signal strength area 406. As illustrated, when the ridership error detection system 114 determines that the requestor device 116 detects the local wireless signals 420, the ridership error detection system 114 determines that the requestor device 116 is within the far signal strength area 406, the near signal strength area 404, or the immediate signal strength area 402.

The ridership error detection system 114 receives and analyzes various types of local wireless signal data to determine the distance between the requestor device 116 and the provider device 104. In at least one embodiment, the ridership error detection system 114 determines the distance by receiving and analyzing an indicator of signal strength of the local wireless signals 420 from at least one of the requestor device 116 or the provider device 104. Additionally, or alternatively, the ridership error detection system 114 receives and analyzes the actual local wireless signals from the requestor device 116 and/or the provider device 104. In at least one embodiment, the ridership error detection system 114 receives a determined distance based on the local wireless signals from the requestor device 116 and/or the provider device 104.

As mentioned, the ridership error detection system 114 determines that the requestor device 116 is beyond the far signal strength area 406 when the local wireless signal strength is not detected. For example, the provider device 104 actively transmits the local wireless signals 420. However, although the requestor device 116 actively scans for the local wireless signals 420, the requestor device 116 will not detect the local wireless signals 420 if the requestor device 116 and the provider device 104 are not within a threshold distance. Thus, based on the determination that the local wireless signal 420 is not found, the ridership error detection system 114 determines that the requestor device 116 is outside of the far signal strength area 406.

In at least one embodiment, the ridership error detection system 114 does not cause the requestor device 116 and the provider device 104 to transmit and/or scan for the local wireless signals 420 when the requestor device 116 is beyond the far signal strength area 406. For example, the ridership error detection system 114 analyzes location signals to identify the general location of the provider device 104 and the requestor device 116. Based on determining that the location signals indicate that the provider device 104 and the requestor device 116 are within a threshold detecting distance, the ridership error detection system 114 causes the devices to begin emitting and/or scanning for the local wireless signals 420.

As illustrated in FIG. 4A, based on detecting that the local wireless signal strength meets a distance threshold, the ridership error detection system 114 determines that the requestor device 116 is within the far signal strength area 406. The far signal strength area 406 comprises the area in which the requestor device 116 first detects the local wireless signals. The far signal strength area 406 ends when the requestor device 116 enters the near signal strength area 404.

As the provider device 104 and the requestor device 116 approach each other, the local wireless signal strength increases. In particular, based on determining that the signal strength meets a near threshold, the ridership error detection system 114 determines that the requestor device 116 is within the near signal strength area 404. In at least one embodiment, the ridership error detection system 114 associates the near signal strength area 404 with an area immediately surrounding the vehicle 102. Based on determining that the requestor device 116 is within the near signal strength area 404, the ridership error detection system 114, the ridership error detection system 114 determines that the requestor 108 is about to or has just finished interacting with (e.g., entering or exiting) the vehicle 102.

Based on determining that the local wireless signal strength meets an immediate threshold, the ridership error detection system 114 determines that the requestor device 116 is within the immediate signal strength area 402. For example, the immediate signal strength area 402 may include the area within a three-foot radius of the provider device 104. In other embodiments where the requestor device 116 transmits the local wireless signals, the immediate signal strength area 402 includes an area within a three-foot radius of the requestor device 116. In one or more embodiments, the ridership error detection system 114 determines that the requestor device 116 is inside the vehicle 102 based on determining that the requestor device 116 is within the immediate signal strength area 402.

Furthermore, in at least one embodiment, the ridership error detection system 114 determines in which seat the requestor 108 is sitting within the immediate signal strength area 402 based on local wireless signal strength. For example, the ridership error detection system 114 identifies, from strongest to weakest, a front passenger seat threshold, a rear left seat threshold, a rear middle seat threshold, and a rear right seat threshold. The ridership error detection system 114 may also learn different configurations (e.g., how many and the distance of various seats) of different vehicles by analyzing local wireless signal strengths of historical requestor devices.

Not only does the ridership error detection system 114 use the local wireless signals 420 to determine whether the requestor device 116 is within the vehicle 102, the ridership error detection system 114 also determines the seat in which the requestor 108 sits to improve roadside safety. In particular, if the ride match includes additional requestors, the ridership error detection system 114 determines which seats are occupied within the vehicle 102 to identify on which side of the vehicle the additional requestors must enter. The ridership error detection system 114 may send notifications to the requestor device 116, the provider device 104, and/or the additional requestor device to alert parties the safest way to enter the vehicle (e.g., avoiding entering the vehicle on a side with traffic). For example, as illustrated in FIG. 4A, the ridership error detection system 114 determines that vacant seats within the vehicle 102 include the front passenger seat and a rear left seat. Based on this determination, the ridership error detection system 114 may send, to the additional requestor device, a notification prompting the additional requestor to enter the vehicle 102 in the front passenger door as to avoid stepping into traffic. Additionally, the ridership error detection system 114 may notify the provider device 104 and/or the requestor device 116 to prompt the requestor 108 to shift seats (i.e., move to the back left seat) to allow additional requestors to safely enter the vehicle. Additionally, the ridership error detection system 114 sends notifications to requestors and the provider to facilitate safe exit. For example, the ridership error detection system 114 can identify an optimal seating arrangement for requestors within the vehicle 102 to ensure that the fewest number of requestors exit the vehicle 102 into traffic.

In addition to determining the signal strength of the local wireless signals 420, the ridership error detection system 114 determines a degree of certainty for the distance between the provider device 104 and the requestor device 116. The ridership error detection system 114 determines a range for which the predicted distance is accurate. For example, the ridership error detection system 114 determines that the requestor device 116 is within two or three meters of the predicted distance based on the detected signal strength. The ridership error detection system 114 links shorter distances between the requestor device 116 and the requestor device 116 with greater degrees of certainty. For example, the ridership error detection system 114 may predict the distance between the provider device 104 and the requestor device 116 within twenty-five centimeters of accuracy when the requestor device 116 is within the immediate signal strength area 402.

In at least one embodiment, the ridership error detection system 114 improves efficiency by coordinating local wireless signal identifications (or simply "signal IDs") between the provider device 104 and the requestor device 116. In particular, the ridership error detection system 114 generates unique signal IDs and sends the signal IDs to both the transmitting device and the scanning device. The transmitting device transmits the local wireless signals 420 having the signal ID and the scanning device scans for the local wireless signals 420 having the unique signal ID. In at least one embodiment, the ridership error detection system 114 generates the unique signal ID by generating a signal ID for every transportation match. In another embodiment, the ridership error detection system 114 assigns a signal ID to the transmitting devices, e.g., the provider device 104.

Although FIG. 4A illustrates determining local wireless signal strengths between a single provider device and a single requestor device 116, the ridership error detection system 114 may implement numerous additional computing devices. Analyzing additional local wireless signals among computing devices increases the accuracy with which the ridership error detection system 114 predicts distances using local wireless signals. The ridership error detection system 114 can increase the number of analyzed local wireless signals by causing computing devices associated with a ride match (e.g., the provider device 104 and the requestor device 116) to both transmit and scan for local wireless signals. Additionally, the ridership error detection system 114 may increase the number of local wireless signals by utilizing multiple additional transmitting and scanning devices. To illustrate, the requestor device 116 may transmit and scan local wireless signals when an additional requestor device joins the matched ride. For instance, as the additional requestor device approaches the vehicle, the ridership error detection system 114 analyzes local wireless signals from the provider device 104, the requestor device 116, and the additional requestor device to predict, with greater accuracy, the distances between the devices.

FIG. 4A illustrates how the ridership error detection system 114 utilizes the local wireless signals 420 between the provider device 104 and the requestor device 116 to determine the location of the requestor device 116 relative to the provider device 104 and subsequently the vehicle 102. FIG. 4B illustrates how the ridership error detection system 114 determines a distance between the requestor device and the provider device based on the strength of the local wireless signals 420. More specifically, FIG. 4B illustrates a table comprising local wireless signal strengths and corresponding ride stages for an example matched ride in which a ridership error does not exist. In at least one embodiment, the ridership error detection system 114 determines that a ridership error exists if the distances determined based on local wireless signal strength at various ride stages deviates from those shown in FIG. 4B.

As illustrated in FIG. 4B, the ridership error detection system 114 determines local wireless signal strengths (and thus distances between the requestor device and the provider device) characteristic of matched rides in which a ridership error does not exist. For instance, as illustrated, during the provider approach stage, the ridership error detection system 114, based on identifying a not found signal strength 410, determines that the requestor device 116 is beyond the far signal strength area 406. The ridership error detection system 114 detects when the requestor device 116 enters the far signal strength area 406 when the requestor device 116 begins detecting the local wireless signals and determines a far signal strength 412. Thus, the ridership error detection system 114 determines that the matched ride is in the provider approach stage.

When the ridership error detection system 114 detects a near signal strength 414, the ridership error detection system 114 determines that the requestor device 116 has entered the near signal strength area 404 and is thus in close proximity to the vehicle 102. Based on detecting that the requestor device 116 is in the near signal strength area 404, the ridership error detection system 114 determines that the matched ride is within the provider approach, the requestor approach, or the open car door ride stages.

As illustrated in FIG. 4B, based on detecting the near signal strength 414, the ridership error detection system 114 may send notifications to the provider device 104 and/or the requestor device 116. For example, the ridership error detection system 114 sends a notification to the provider device 104 that alerts the provider that the requestor 108 is near the vehicle. In at least one embodiment, the ridership error detection system 114 sends a notification to the requestor device 116 confirming that the requestor 108 is approaching and about to interact with the correct vehicle.

As illustrated in FIG. 4B, the ridership error detection system 114 detects that a ridership error exists when the ridership error detection system 114 fails to detect the near signal strength 414 at the appropriate ride stages. If the ridership error detection system 114 detects that the local wireless signal reaches, at its strongest, the near signal strength 414, the ridership error detection system 114 may determine that a ridership error exists. For example, the requestor 108 may have approached and entered a different vehicle than the vehicle 102 of the transportation match.

During a matched ride in which a ridership error does not exist, the ridership error detection system 114 determines that the requestor device 116 enters the correct vehicle 102 based on detecting an immediate signal strength 416. As mentioned, the ridership error detection system 114 associates the immediate signal strength 416 with the requestor device 116 entering the immediate signal strength area 402 and, thus, the vehicle 102. Based on detecting the immediate signal strength 416, the ridership error detection system 114 detects that the matched ride is in the requestor enter stage, the close car door stage, or the vehicle movement stage.

As illustrated in FIG. 4B, if the ridership error detection system 114 detects the immediate signal strength 416, the ridership error detection system 114 commences the ride. In at least one embodiment, the ridership error detection system 114 automatically commences the matched ride without receiving input at the provider device 104. Traditionally, the dynamic transportation matching system 112 receives input from the provider device 104 indicating that the provider has picked up the requestor 108. In at least one embodiment, the ridership error detection system 114 causes the provider device 104 and/or the requestor device 116 to automatically log a ride commencement time when the device(s) detect the immediate signal strength 416. Thus, even if the provider device 104 and the requestor device 116 are out of reception (e.g., no cell service) or otherwise disconnected for the dynamic transportation matching system 112, the requestor device 116 and the provider device 104 can log the time of the ride commencement. The ridership error detection system 114 accesses the logged ride commencement time when the provider device 104 or the requestor device 116 regain reception.

In at least one embodiment, the ridership error detection system 114 automatically detects that a ridership error exists within a matched ride when the ridership error detection system 114 fails to detect the immediate signal strength 416. For example, the ridership error detection system 114 might detect, based on various other provider-requestor signals, that the requestor device 116 begins movement away from the pickup location but is not within the immediate signal strength area 402. Thus, the ridership error detection system 114 applies a greater confidence score to a determined ridership error.

In one or more embodiments, the ridership error detection system 114 analyzes distances based on local wireless signals emitted and received by computing devices that are not part of the transportation match. More particularly, if the dynamic transportation matching system 112 dispatches multiple provider devices to a single pick-up location (e.g., an airport), and consistent with user privacy settings, the ridership error detection system 114 can send additional signal IDs for a transportation match to additional provider devices and additional requestor devices within a threshold distance of the pickup location. The additional provider devices and the additional requestor devices may emit and scan for additional local wireless signals having the additional signal IDs. The ridership error detection system 114 analyzes the distances determined based on the additional local wireless signals to determine whether the requestor device 116 is in closer proximity to the provider device 104—indicating no ridership error—or to additional provider devices and additional requestor devices.

In at least one embodiment, the ridership error detection system 114 uses distances determined based on local wireless signals to determine a transportation match. For example, the dynamic transportation matching system 112 can determine transportation matches at pickup locations when a requestor enters a vehicle. The dynamic transportation matching system 112 identifies available provider devices at a pickup location and sends unique provider signal IDs to the available provider devices. The dynamic transportation matching system 112 sends the unique provider signal IDs to a requestor device that has submitted a ride request, and the requestor device begins scanning for local wireless signals with the unique provider signal IDs. The dynamic transportation matching system 112 determines a transportation match based on the nearest available provider device to the requestor device based on signal strengths of local wireless signals. The dynamic transportation matching system 112 sends, to the requestor device, a notification indicating the nearest available provider device and identifying information (e.g., vehicle make, model, provider name, approximate distance). Based on detecting that the requestor device inters the immediate signal strength area of the matched provider device, the dynamic transportation matching system 112 commences the matched ride.

In addition to determining distances based on local wireless signals, as illustrated in FIGS. 4A-4B, the ridership error detection system 114 analyzes audio signals. FIGS. 5A-5B illustrate how the ridership error detection system 114 analyzes audio signals to determine whether or not a ridership error exists. For example, based on detecting an audio mismatch, the ridership error detection system 114 determines, with greater confidence, that a ridership error exists. FIG. 5B illustrates detecting an audio match, which the ridership error detection system 114 associates with a lower likelihood of ridership error.

Generally, FIG. 5A illustrates the ridership error detection system 114 determining an audio mismatch 506. In FIG. 5A, the requestor device 116 enters an incorrect vehicle 516, which is any vehicle that is not the vehicle 102 linked with the provider device 104. The ridership error detection system 114 accesses requestor audio signals 502 and provider audio signals 504 (collectively "audio signals"), analyzes the accessed audio signals, and determines the audio mismatch 506. The ridership error detection system 114 analyzes the requestor audio signals 502 and the provider audio signals 504 by (a) comparing the requestor audio signals 502 and the provider audio signals 504 to determine a similarity between the audio signals, (b) comparing the audio signals with pre-determined voice signatures of the provider or requestor to determine an identity of a speaker within the audio signals, (c) analyzing audio signals to identify key terms corresponding to the transportation match, (d) analyzing voice tone characteristics within the audio signals to determine a sentiment associated with the audio signals, and/or others. The ridership error detection system 114 accesses audio signals from the requestor device 116 and the provider device 104 in accordance with provider and requestor privacy settings.

As illustrated in FIG. 5A, the ridership error detection system 114 compares the requestor audio signals 502 and the provider audio signals 504. In one embodiment, comparing the requestor audio signals 502 and the provider audio signals 504 excludes analyzing content (e.g., spoken words) within the audio signals to determine a similarity between the requestor audio signals 502 and the provider audio signals 504. For example, the ridership error detection system 114 analyzes the requestor audio signals 502 and the provider audio signals 504 to determine whether the provider device 104 and the requestor device 116 capture the same sounds. In particular, the ridership error detection system 114 analyzes audio signals from the provider device 104 and the requestor device 116 for segments with matching time stamps (i.e., recorded at the same time). The ridership error detection system 114 uses an audio comparison algorithm to identify similarities between the audio signals and calculate a similarity score. Based on the similarity score meeting a threshold similarity value, the ridership error detection system 114 determines a higher likelihood of the audio match 514. As illustrated, as the requestor opens the door of the incorrect vehicle 516, the requestor audio signals 502 include a door sound and the requestor voice signature. The provider audio signals 504, on the other hand, do not register any sounds. Thus, the ridership error detection system 114 determines a mismatch between the requestor audio signals 502 and the provider audio signals 504, which is indicative of an audio mismatch.

In at least one embodiment, as part of comparing the requestor audio signals 502 and the provider audio signals 504, the ridership error detection system 114 counts the number of unique voices within the audio signals. The ridership error detection system 114 utilizes a voice identification algorithm to identify unique voices within audio signals. In at least one embodiment, the ridership error detection system 114 simply counts the number of unique voices within both audio signals. The ridership error detection system 114 identifies the audio mismatch 506 when difference between the number of unique voices in the requestor audio signals 502 and the provider audio signals 504 meets a difference threshold. Additionally, in at least one embodiment, compares the number of unique voices with a predicted number of voices based on users involved in the transportation match. In particular, the ridership error detection system 114 tracks the number of requestors and providers within a transportation match and determines the audio mismatch 506 based on the number of unique voices deviating from the predicted number of voices.

The ridership error detection system 114 can also compare the audio signals with pre-determined voice signatures to determine an identity of a speaker within the audio signals (e.g., identify the rider and/or driver). Generally, the ridership error detection system 114 compares the requestor audio signals 502 and the provider audio signals 504 with pre-determined voice signatures. The ridership error detection system 114 uses a voice recognition algorithm to analyze the audio signals to recognize pre-determined voice signatures. For example, the ridership error detection system 114 uses the voice recognition algorithm and a pre-determined voice signature for the provider to determine whether the requestor audio signals 502 include the voice of the provider. As illustrated in FIG. 5A, the ridership error detection system 114 does not identify the provider's pre-determined voice signature within the requestor audio signals 502. Likewise, the ridership error detection system 114 compares the provider audio signals 504 with a pre-determined voice signature for the requestor. As illustrated, the requestor audio signals 502 include the requestor voice signature but not the provider voice signature. Thus, the ridership error detection system 114 determines the audio mismatch 506.

To illustrate, the ridership error detection system 114 can search audio signals captured by a provider device to identify the voice signature of the requestor. Similarly, the ridership error detection system 114 can search audio signals captured by a requestor device to identify the voice signature of the driver.

Consistent with provider and requestor privacy settings, the ridership error detection system 114 can obtain pre-determined voice signatures based on provided from requestors or providers. For example, in setting up a transportation matching application, the ridership error detection system 114 can provide an option of providing a voice recording for determining a voice signature. Providers and/or riders can opt to provide a voice recording to assist in detecting ride errors.

In some instances, a matched ride may involve different drivers and riders than those identified in the transportation match. For example, a requestor traditionally linked with the requestor device 116 may submit a transportation request for another rider (e.g., a friend or family member). The ridership error detection system 114 may avoid erroneously identifying a ridership error in such instances by sending, to the requestor device 116, an option to indicate that a different rider will participate in the matched ride. Thus, the ridership error detection system 114 may skip comparing the audio signals with pre-determined requestor voice signatures.

Additionally, the ridership error detection system 114 analyzes the requestor audio signals 502 and the provider audio signals 504 to identify key terms (e.g., provider name, requestor name, destination, etc.) corresponding to the transportation match to identify the audio mismatch 506. For example, the ridership error detection system 114 analyzes the requestor audio signals 502 and the provider audio signals 504 to determine whether the requestor name and/or the provider name is spoken. In particular, the ridership error detection system 114 determines a lower likelihood of the audio mismatch 506 when the audio signals include mention of the names of the requestor and/or provider. The ridership error detection system 114 utilizes a voice-to-text algorithm to identify spoken content of the requestor audio signals 502 and the provider audio signals 504. The ridership error detection system 114 analyzes the generated text to determine whether the name of the requestor or the provider is included in the audio signals. Additionally, the ridership error detection system 114 may analyze the generated text to determine whether the destination name, pickup location, or a landmark or destination relevant to the destination, pickup location, or en route is spoken. Based on detecting the destination name, the ridership error detection system 114 determines a lower likelihood of the audio mismatch 506.

Furthermore, the ridership error detection system 114 may determine a higher likelihood of the audio mismatch 506 based on detecting other terms or phrases within the audio signals. For example, the ridership error detection system 114 may determine a higher likelihood of the audio mismatch 506 based on detecting phrases such as "no, wrong car," "sorry, who are you?" or other similar phrases indicating a ridership error. Additionally, the ridership error detection system 114 can recognize emergency keywords such as "help." Emergency keywords may be predetermined based on keywords commonly associated with stressful situations. Alternatively, the ridership error detection system 114 may predetermine emergency keywords based on user input.

As mentioned, in at least one embodiment, the ridership error detection system 114 also analyzes voice tone characteristics within the requestor audio signals 502 and the provider audio signals 504 to determine a sentiment (e.g., argumentative, heated, or distressed sentiment) associated with the audio signals. In particular, the ridership error detection system 114 monitors speaking volume, voice stress, voice speed, and other voice tone characteristics. For instance, the ridership error detection system 114 identifies the presence of human speech within received audio signals. In at least one embodiment, the ridership error detection system 114 uses a voice activity detection algorithm to detect the presence of human speech. The ridership error detection system 114 analyzes characteristics of the detected speech to determine the speaking volume, voice stress, and voice speed of identified voices. Based on analyzing the voice tone characteristics, the ridership error detection system 114 determines a sentiment based on the voice tone characteristics. For example the ridership error detection system 114 detects whether speakers captured by the requestor audio signals 502 and/or the provider audio signals 504 are excited, scared, angry, sad, happy, or experiencing other sentiments or emotion.

In at least one embodiment, the ridership error detection system 114 trains a vocal emotion machine learning model to determine stressful situations based on audio signals. For example, the vocal emotion tone machine learning model can predict whether voices within an audio signal exhibit emotions including joy, anger, sadness, calmness, excitement, or others. In at least one embodiment, the ridership error detection system 114 trains the vocal emotion machine learning model by using training audio signals and ground truth labels. The vocal emotion machine learning model outputs predictions of emotions linked to voices within the audio signal. The ridership error detection system 114 trains the vocal emotion machine learning model using emotion labels of voices within the training audio signals. The ridership error detection system 114, may perform additional actions based on recognizing aggressiveness or argumentative emotions within voice signals. For example, the ridership error detection system 114 may send interactive notifications to at least one of the requestor device 116 or the provider device 104. Additionally, based on detecting argumentative or aggressive voice tones, the ridership error detection system 114 can increase the confidence level of a potential ridership error.

Additionally, though not illustrated, the ridership error detection system 114 causes the provider device 104 to emit a sound. The ridership error detection system 114 analyzes the requestor audio signals 502 to determine whether the requestor audio signals 502 capture the emitted sounds and thus indicate that the requestor device 116 is within hearing distance of the provider device 104. For example, the ridership error detection system 114 can cause the provider device 104 to emit a high-pitched tone that is unperceivable by the human ear. The requestor device can receive the high-pitched tone and confirm that there is no ridership error (e.g., by comparing the high-pitched tone to a pre-determined tone corresponding to the provider). In other embodiments, the ridership error detection system 114 causes the requestor device 116 to emit a sound (e.g., a sound outside the range of human perception) and analyzes the provider audio signals 504.

Furthermore, in at least one embodiment, the ridership error detection system 114 determines an audio match or mismatch based on echolocation. In one embodiment, the ridership error detection system 114 causes the provider device 104 to emit a sound (or light signal or other signal that can track distances, locations, or contours of an environment). The provider device 104 may comprise a display device that is fixed in a location within the vehicle (e.g., on the dashboard or on a console). The provider device 104 emits a sound (or light signal) and records reflected signals received immediately after emitting the sound. The ridership error detection system 114 determines baseline reflected audio signals by analyzing the reflected audio signals when the vehicle 102 does not have a passenger. The ridership error detection system 114 analyzes reflected audio signals at various ride stages and compares them with the baseline reflected audio signals. The ridership error detection system 114 can determine, using echolocation, whether a passenger or item is within the vehicle.

FIG. 5A illustrates determining the audio mismatch 506. In contrast, FIG. 5B illustrates the ridership error detection system 114 determining an audio match 514. As illustrated in FIG. 5B, the requestor device 116 is about to enter the vehicle 102 associated with the provider device 104. The ridership error detection system 114 accesses provider audio signals 510 from the provider device 104 and requestor audio signals 512 from the requestor device 116. As previously discussed, the ridership error detection system 114 analyzes the provider audio signals 510 and the requestor audio signals 512 by comparing the audio signals, comparing the audio signals with pre-determined voice signatures, analyzing audio signals to identify key terms, and/or analyzing voice tone characteristics within the audio signals. As illustrated in FIG. 5B, the ridership error detection system 114 determines that both the requestor audio signals 512 and the provider audio signals 510 capture a door sound, the requestor's voice signature, the provider's voice signature, identified key terms corresponding to the transportation match. Based on these determinations, the ridership error detection system 114 identifies the audio match 514.

FIGS. 5A-5B illustrate how the ridership error detection system 114 utilizes audio signals to identify a potential ridership error. As mentioned, FIGS. 6A-6B illustrate how the ridership error detection system 114 analyzes IMU signals from the requestor device 116 and the requestor device 116 to determine a potential ridership error. In particular, FIG. 6A illustrates an IMU mismatch 606 resulting from the requestor device 116 entering the incorrect vehicle 516. FIG. 6B illustrates an IMU match 614 when the requestor device 116 is in the vehicle 102 with the provider device 104.

Generally, IMU signals comprise data captured by an inertial measurement unit. In particular, IMU signals include the force, angular rate, and/or orientation of computing devices. For example, IMU signals are captured at the requestor device 116 and the provider device 104 using a combination of accelerometers, gyroscopes, magnetometers, and/or other devices.

As illustrated in FIG. 6A, the ridership error detection system 114 analyzes the requestor IMU signals 602 and the provider IMU signals 604. As illustrated, the requestor IMU signals 602 capture the acceleration of the requestor device 116 in the incorrect vehicle 516. In contrast, the ridership error detection system 114 detects minimal acceleration in the provider IMU signals 604 from the requestor device 116 within the vehicle 102. The ridership error detection system 114 compares the requestor IMU signals 602 with the provider IMU signals 604 and determines the IMU mismatch 606. In particular, the ridership error detection system 114 utilizes various algorithms to determine the acceleration as well as changes in rotational attributes of the requestor device 116 and the provider device 104. The ridership error detection system 114 analyzes the requestor IMU signals 602 and the provider IMU signals 604 registered within the same time period to determine whether the recorded acceleration and rotational attributes are similar. Based on determining that the IMU signals meet a difference threshold, the ridership error detection system 114 determines the IMU mismatch 606.

The ridership error detection system 114 also determines the IMU mismatch 606 based on comparing the requestor IMU signals 602 and the provider IMU signals 604 with expected IMU signals at various ride stages. For example, in addition to determining the IMU mismatch 606 by simply comparing the requestor IMU signals 602 with the provider IMU signals 604, the ridership error detection system 114 compares the IMU signals at specific ride stages to predicted IMU signals. As briefly described in FIG. 2A, the ridership error detection system 114 analyzes IMU signals as part of a set of provider-requestor consistency signals at particular ride stages. In at least one embodiment, the ridership error detection system 114 analyzes IMU signals at the requestor approach stage 212, the requestor enter stage 216, and the vehicle movement stage 220. The ridership error detection system 114 predicts that, at the requestor approach stage 212, the requestor IMU signals 602 indicate acceleration as the requestor approaches the vehicle 102 and the provider device 104 indicates that it is slowing (e.g., stopping at the pickup location). At the requestor enter stage 216, the ridership error detection system 114 predicts that the provider IMU signals 604 show no acceleration as the vehicle 102 is stopped at the pickup location and the requestor IMU signals 602 indicate acceleration consistent with the requestor entering the vehicle 102. At the close car door stage, the ridership error detection system 114 predicts that the provider IMU signals 604 and the requestor IMU signals 602 will have similar baseline or background vibrations and accelerations (e.g., similar vibrations of the vehicle in which they are both sitting). Moreover, at the vehicle movement stage 220, the ridership error detection system 114 predicts that the requestor IMU signals 602 and the provider IMU signals 604 should indicate the same acceleration as the vehicle 102 begins movement. The ridership error detection system 114 determines the IMU mismatch 606 based on deviations between predicted IMU signals with the requestor IMU signals 602 and the provider IMU signals 604.

In contrast, FIG. 6B illustrates the ridership error detection system 114 comparing the provider IMU signals 610 with the requestor IMU signals 612 when the provider device 104 and the requestor device 116 are both within the vehicle 102. As illustrated, the ridership error detection system 114 determines that the IMU signals from the requestor device 116 and the provider device 104 match. Thus, the ridership error detection system 114 determines a lower likelihood of a potential ridership error. In at least one embodiment, the ridership error detection system 114 determines that the provider IMU signals 610 and the requestor IMU signals 612 satisfy a similarity threshold. Based on determining that the IMU signals satisfy the similarity threshold, the ridership error detection system 114 determines that the ridership error does not (or does) exist.

In addition to analyzing IMU signals, the ridership error detection system 114 analyzes location signals to determine whether or not a ridership error exists. As mentioned, FIGS. 7A-7B illustrate how the ridership error detection system 114 utilizes location signals to determine whether a ridership error exists. FIG. 7A illustrates the ridership error detection system 114 determining a location mismatch 708 based on provider location signals 702 and requestor location signals 704. FIG. 7B illustrates the ridership error detection system 114 determining a location match 716 based on provider location signals 710 and requestor location signals.

Generally, location signals indicate the locations of the provider device 104 and the requestor device 116. Location signals comprise the latitude and longitude of the computing devices. In at least one embodiment, location signals from the requestor device 116 and the provider device 104 comprise data captured by GPS trackers.

As illustrated in FIG. 7A, the ridership error detection system 114 determines that a location mismatch 708 exists. The ridership error detection system 114 determines the location mismatch 708 by accessing the provider location signals 702 and the requestor location signals across various ride stages. More particularly, the ridership error detection system 114 detects the location mismatch 708 when ridership error detection system 114 determines that the provider location signals 702 and the requestor location signals 704 indicate different locations during ride stages in which the requestor device 116 and the provider device 104 should be at the same location (e.g., the requestor device 116 is in the vehicle 102). For example, the ridership error detection system 114 determines the location mismatch 708 based on detecting that, during the anticipated requestor error stage 215, the close car door stage 218, or the vehicle movement stage 220, the provider location signals 702 and the requestor location signals 704 indicate different locations.

As illustrated in FIG. 7B, the ridership error detection system 114 determines a location match 716 based on analyzing provider location signals 710 and requestor location signals 712. More particularly, the ridership error detection system 114 determines the location match by analyzing the provider location signals 710 and the requestor location signals 712 across ride stages. For example, the ridership error detection system 114 determines that the provider location signals 710 and the requestor location signals 712 indicate that the provider device 104 is en route to the pickup location and that the requestor device 116 is at or close to the pickup location. During the requestor approach stage 212, the open car door stage 214, the requestor enter stage 216, and the close car door stage 218, the ridership error detection system 114 determines that the provider location signals 710 and the requestor location signals 712 are both at the pickup location. During the vehicle movement stage 220 and the following ride stages, the ridership error detection system 114 determines that the requestor device 116 and the provider device 104 have the same or similar locations as they move toward the dropoff location.

As illustrated in FIGS. 7A-7B, the ridership error detection system 114 compares provider location signals and requestor location signals to determine the location match 716 or the location mismatch 708. In additional embodiments, consistent with user privacy settings, the ridership error detection system 114 shares location data from the location data with third parties not involved in the transportation match. For example, the ridership error detection system 114 can automatically send location and ride stage updates to contacts (e.g., friends or family) provided to the ridership error detection system 114 by the requestor device 116 and/or the provider device 104 for the duration of a matched ride. In at least one embodiment, the ridership error detection system 114 sends location data to contacts based on determining that a ridership error exists.

Figure 8:
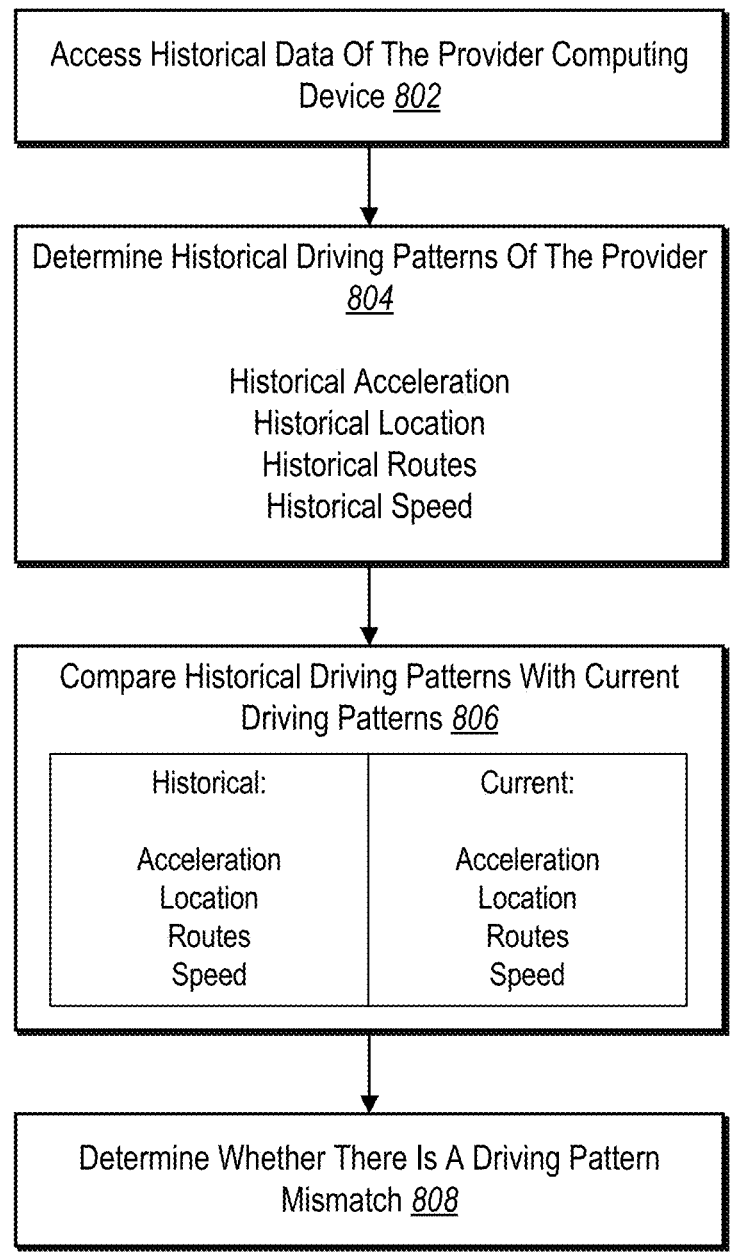
FIG. 8 illustrates utilizing historical driving patterns and current driving patterns to determine ridership errors in accordance with one or more embodiments.

FIGS. 4A-7B illustrate how the ridership error detection system 114 analyzes various provider-requestor consistency signals to predict whether a ridership error exists. In at least one embodiment, the ridership error detection system 114 analyzes a combination of signals of the provider-requestor consistency signals to determine historical and current driving patterns. FIG. 8 illustrates how the ridership error detection system 114 utilizes historical and current driving patterns to determine whether there is a driving pattern mismatch. As illustrated in FIG. 8, the ridership error detection system 114 performs an act 802 of accessing historical data of the provider computing device, an act 804 of determining historical driving patterns of the provider, an act 806 of comparing historical driving patterns with current driving patterns, and an act 808 of determining whether there is a driving pattern mismatch.

As illustrated in FIG. 8, the ridership error detection system 114 performs the act 802 of accessing historical data of the provider computing device. The ridership error detection system 114 accesses one or more of the location signals and the IMU signals of the provider device 104. The ridership error detection system 114 accesses additional information such as including historical route data. For example, the ridership error detection system 114 identifies historical proposed routes in transportation matches and the actual routes used by the provider device 104. In at least one embodiment, the ridership error detection system 114 accesses data for the vehicle 102. For instance, the ridership error detection system 114 accesses odometer data, acceleration data, and other data relevant to driving patterns.

In the act 804, the ridership error detection system 114 determines historical driving patterns of the provider. The ridership error detection system 114 analyzes the accessed historical data to generate historical driving patterns. Historical driving patterns include historical driving pattern features including acceleration, location, routes, and speed. The ridership error detection system 114 determines historical acceleration rates associated with the provider device 104. The ridership error detection system 114 also determines historical locations of the provider device 104 including areas where the provider device 104 frequents. The ridership error detection system 114 determines historical routes used by the provider device 104. In particular, the ridership error detection system 114 also compares historical suggested routes with historical actual routes taken by the provider device 104 to determine whether or not the provider device 104 likely follows suggested routes. Additionally, the ridership error detection system 114 determines historical speed. The ridership error detection system 114 uses a combination of location data, acceleration data, and time elapsed to determine historical speed. Furthermore, in at least one embodiment, the ridership error detection system 114 compares the historical speed with known speed limit information along routes to determine how often the provider device 104 moves at a speed above or below the speed limit.

As illustrated in FIG. 8, in the act 806, the ridership error detection system 114 compares historical driving patterns with current driving patterns. In particular, the ridership error detection system 114 accesses current signals and other data for the requestor device 116 to determine current driving features. The ridership error detection system 114 compares the historical driving pattern features with the current driving pattern features. For example, the ridership error detection system 114 compares current acceleration data obtained using IMU signals of the requestor device with historical acceleration data of the provider device 104. In at least one embodiment, the ridership error detection system 114 also accesses current driving patterns of the provider device 104 and compares the current driving patterns of the provider device 104 with the historical driving patterns of the provider device.

In the act 808, the ridership error detection system 114 determines whether there is a driving pattern mismatch. In at least one embodiment, the ridership error detection system 114 determines a driving pattern mismatch based on the number of deviating current driving pattern features meeting a threshold. For example, the ridership error detection system 114 assigns predetermined threshold differences to each of the driving pattern features (e.g., acceleration, location, routes, and speed). The ridership error detection system 114 counts the number of deviating current driving pattern features that meet the predetermined threshold differences. Based on the threshold number of deviating current driving pattern features meeting a threshold, the ridership error detection system 114 determines a driving pattern mismatch.

In at least one embodiment, the ridership error detection system 114 performs the act 808 of determining whether there is a driving pattern mismatch by assigning scores to each of the current driving pattern features. The ridership error detection system 114 assigns higher scores (e.g., 1) to current driving pattern features that match or are similar to historical driving pattern features. The ridership error detection system 114 combines the scores for the current driving pattern features, and determines, based on the combined score a confidence score for a driving pattern match or mismatch. Higher combined scores are linked with higher likelihoods of driving pattern matches while lower combined scores are linked with higher likelihoods of driving pattern mismatches.

Figure 9:
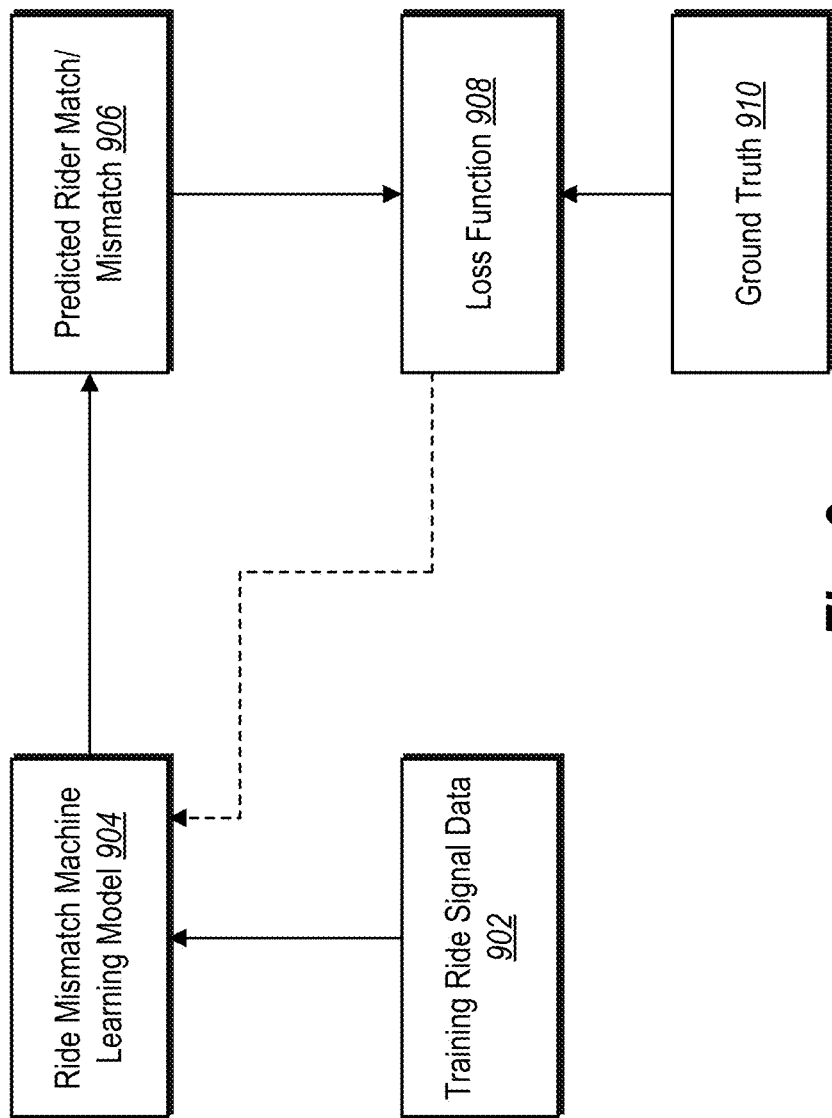
FIG. 9 illustrates an example ride mismatch machine learning model in accordance with one or more embodiments.

In one or more embodiments, the ridership error detection system 114 utilizes a trained ride mismatch machine learning model to predict a rider match or mismatch (i.e., a ridership error). As illustrated in FIG. 9, the ridership error detection system 114 trains and applies a ride mismatch machine learning model 904. More specifically, the ridership error detection system 114 uses training ride signal data 902 as input to the ride mismatch machine learning model 904. Training ride signal data 902 can include a variety of measured training signals corresponding to historical known rides (e.g., rides with known ridership errors and rides known not to include ridership errors). Thus, for instance, the training ride signal data 902 can include local wireless signals, IMU signals, audio signals, and/or location signals across one or more ride stages.

As shown in FIG. 9, the ridership error detection system 114 utilizes the ride mismatch machine learning model 904 to analyze the training ride signal data 902 to generate a predicted rider match/mismatch 906. The ride mismatch machine learning model 904 can comprise a variety of machine learning models. For example, in some embodiments, the ride mismatch machine learning model 904 includes a neural network, such as a convolutional neural network (to generate a classification confidence score of a ridership error) or a recurrent neural network (to generate different scores over time based on a sequence of input signals over time). The ride mismatch machine learning model 904 can also include other machine learning models, such as a decision tree, naïve bayes, logistic regression, or a support vector machine.

To illustrate, with regard to a neural network implementation, the ridership error detection system 114 analyzes the training ride signal data 902 utilizing artificial neurons (or layers) of the neural network to generate a predicted rider match/mismatch 906. This prediction can comprise a confidence score that the training ride signal data corresponds to a ridership error.

As shown in FIG. 9, the ridership error detection system 114 utilizes a loss function 908 to determine a measure of loss between the predicted rider match/mismatch 906 and a ground truth 910. The ground truth 910 indicates whether the training rid signal data corresponds to a ridership mismatch. By comparing the ground truth 910 and predicted rider match/mismatch 906 (utilizing the loss function 908), the ridership error detection system 114 can determine the inaccuracy of the prediction and train the ride mismatch machine learning model 904. For example, with regard to neural network implementations, the ridership error detection system 114 can back propagate the measure of loss to modify internal neural network parameters. In this manner, the ridership error detection system 114 can iteratively train the ride mismatch machine learning model 904 to accurately determine ridership errors.

The training ride signal data 902 comprise provider-requestor consistency signals for historical matched rides. For instance, the training ride signal data 902 includes location signals, local wireless signals, IMU signals, audio signals, and historical data across ride stages for all matched rides.

Although FIG. 9 illustrates a single ride mismatch machine learning model 904, the ridership error detection system 114 can train and apply multiple ride mismatch machine learning models. For example, in some embodiments, the ridership error detection system 114 utilizes different models for one or more provider-requestor consistency signals. To illustrate, the ridership error detection system 114 can apply a first ride mismatch machine learning model to audio signals to generate a first confidence score. The ridership error detection system 114 can apply a second ride mismatch machine learning model to IMU signals to generate a second confidence score. The ridership error detection system can then combine the first confidence score and the second confidence score to generate a final confidence score.

Although the foregoing example references to confidence scores from two models, the ridership error detection system 114 can generate various confidence scores for various signals (at various ridership stages) to generate an overall confidence score. The ridership error detection system 114 can apply various weights to various confidence scores corresponding to one or more signals to generate different overall scores. For example, in some embodiments, the ridership error detection system 114 utilizes a first weight for local wireless signals, a second weight for IMU signals, a third weight for audio signals (or some portion of audio signals), and a fourth weight for driving signals. The ridership error detection system 114 can determine a confidence score for each signal and combine the confidence score according to the weights to determine an overall confidence score.

In some embodiments, the ridership error detection system 114 utilizes different weights for one or more ridership stages. For example, the ridership error detection system 114 can utilize a first set of weights for a first stage and a second set of weights for a second stage. The ridership error detection system 114 can apply the first set of weights to a first set of confidence scores for a first set of provider-requestor consistency signals collected at the first stage and apply the second set of weights to a second set of confidence scores for a second set of provider-requestor consistency signals collected at the second stage. In this manner, the ridership error detection system 114 can determine an overall confidence score for one or more signals at one or more stages.

Moreover, although FIG. 9 utilizes machine learning models to predict ridership errors, the ridership error detection system 114 can utilize heuristic rules or other models to predict ridership errors. For example, the ridership error detection system 114 can apply threshold rules to various signals to determine confidence values. For instance, if a distance metric varies by a threshold distance, the ridership error detection system 114 can select a particular confidence value of a ridership error. Similarly, if IMU values for a provider and requestor vary by a threshold amount, the ridership error detection system can map utilize a particular confidence value of a ridership error. The ridership error detection system 114 can utilize heuristic rules to map particular signals to particular confidence values (e.g., based on historical data).

Figure 10A:
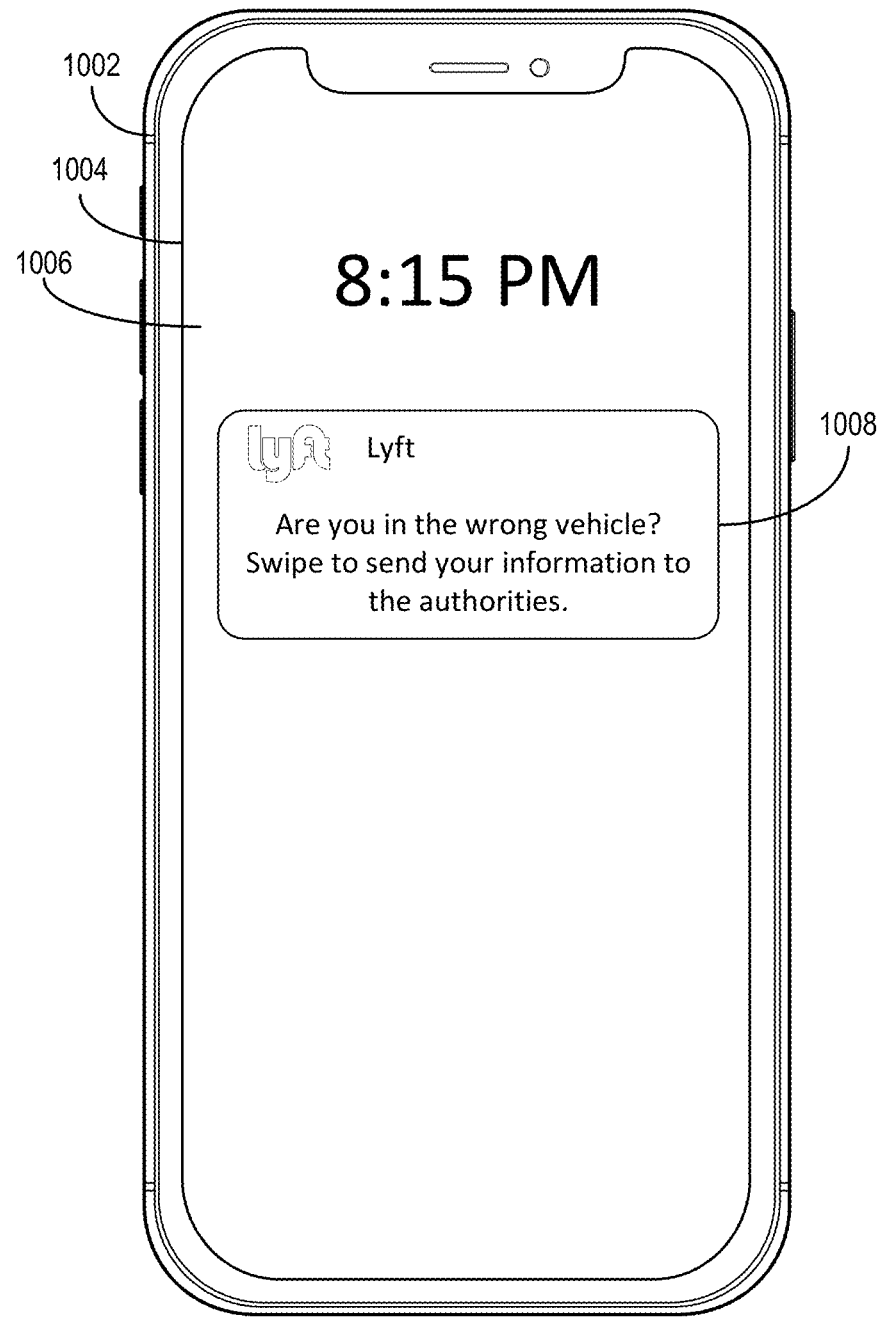
FIGS. 10A-10C illustrate a series of graphical user interfaces with notifications of ridership error in accordance with one or more embodiments.
Figure 10B:
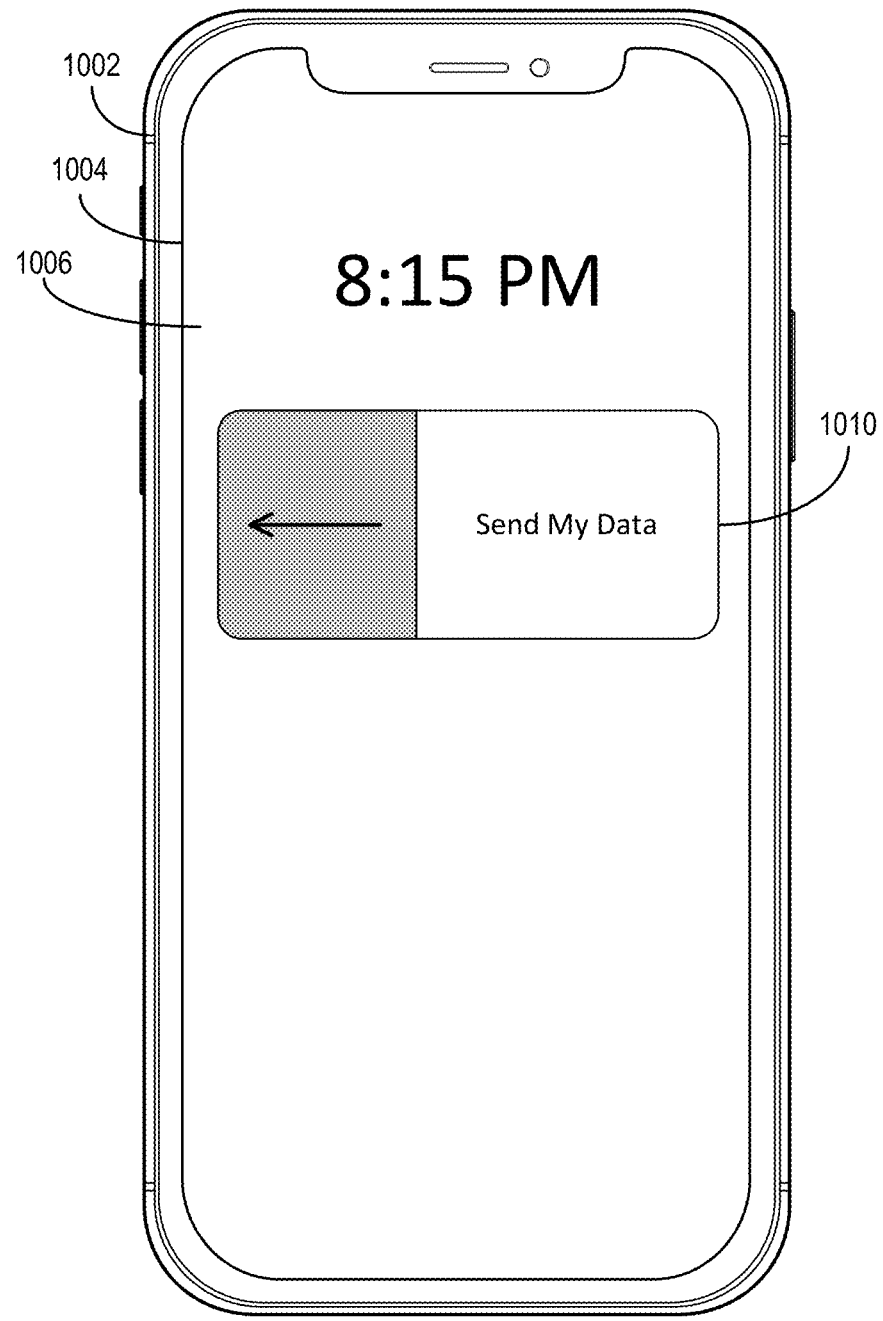
Figure 10C:
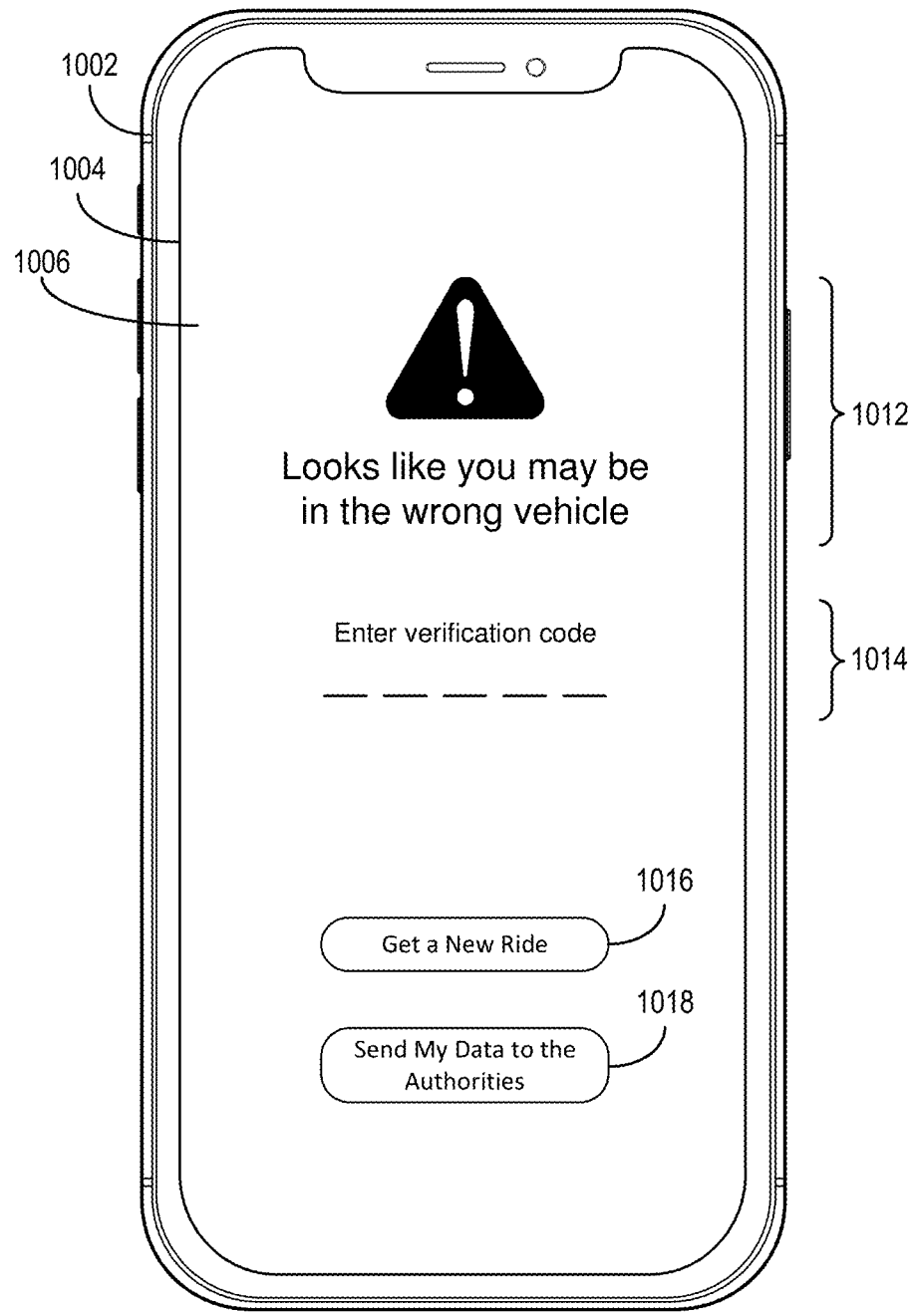

As mentioned above, based on determining a ridership error score, the ridership error detection system 114 can provide a digital notification to at least one of the requestor device 116 or the provider device 104. In at least one embodiment, the ridership error detection system 114 presents ridership error notifications at the requestor device 116. FIGS. 10A-10C illustrate a series of example ridership error notifications. FIG. 10A illustrates an interactive ridership error notification within the graphical user interface of a requestor device when the ridership error detection system 114 determines that a ridership error exists. FIG. 10B illustrates the updated ridership error notification graphical user interface following on user interaction. FIG. 10C illustrates a ridership error notification graphical user interface within the requestor application 118.

FIG. 10A illustrates an example interactive ridership error notification 1008. As illustrated, the ridership error detection system 114 presents the interactive ridership error notification 1008 as part of a graphical user interface 1006 on a screen 1004 of a client device 1002 (e.g., the requestor device 116 or the provider device 104). As illustrated, the interactive ridership error notification 1008 includes text indicating that the ridership error detection system 114 has detected a potential ridership error.

The ridership error detection system 114 performs various actions based on user interaction with the interactive ridership error notification 1008. For example, based on detecting a swipe of the interactive ridership error notification 1008, the ridership error detection system 114 performs an automatic emergency function such as sending device data to authorities. This disclosure provides additional detail regarding automatic emergency functions in FIG. 10B and the accompanying discussion. Additionally, based on detecting a different user interaction such as a user pressing or tapping on the notification, the ridership error detection system 114 provides additional options to the user via a ridership error notification graphical user interface. FIG. 10C and the accompanying discussion provide additional detail regarding the ridership error notification graphical user interface.

Although FIG. 10A illustrates the interactive ridership error notification 1008 as presented on the requestor device 116, the ridership error detection system 114 can present the interactive ridership error notification 1008 at the provider device 104. For example, the ridership error detection system 114 presents a provider-specific ridership error notification that indicates that the current rider may be incorrect (i.e., not the requestor identified in the transportation match). Based on detecting that the provider swiped the interactive ridership error notification 1008, the ridership error detection system 114 may send provider device information to authorities or emergency contacts. Based on detecting other interactions such as a tap, the ridership error detection system 114 presents a ridership error notification graphical user interface as illustrated in FIG. 10C.

As illustrated in FIG. 10B, based on detecting a user swipe of the interactive ridership error notification 1008, the ridership error detection system 114 presents an updated ridership error notification 1010. In addition to presenting the updated ridership error notification 1010, the ridership error detection system 114 performs an automatic emergency function. The ridership error detection system 114 presents the updated ridership error notification 1010 as part of the graphical user interface 1006 on the client device 1002. The ridership error detection system 114 presents the updated ridership error notification 1010 at the requestor device 116 and at the provider device 104.

The ridership error detection system 114 can utilize predetermined automatic emergency functions such as sending device data to the authorities such as police. For example, based on detecting requestor interaction with the interactive ridership error notification 1008 the ridership error detection system 114 may send text messages or initiate a voice call with authorities. In cases where the ridership error detection system 114 initiates a voice call with the police, the ridership error detection system 114 communicates text-to-speech information to the police operator about the current location of the requestor device 116 and/or the provider device 104. The ridership error detection system 114 may also perform automatic emergency functions determined by the requestor and/or the provider. For instance, the ridership error detection system 114 may send information about the requestor device 116 to an emergency contact designated by the requestor or the provider.

As mentioned, based on detecting a user tap or other selection of the interactive ridership error notification 1008, the ridership error detection system 114 presents a ridership error notification graphical user interface. FIG. 10C illustrates an example ridership error notification graphical user interface 1020 presented on the screen 1004 of the client device 1002. As illustrated, the ridership error notification graphical user interface 1020 includes a ridership error notification, a confirmation element, a new ride element 1016, and an alert authorities element 1018.

FIG. 10C illustrates the example ridership error notification graphical user interface 102 as presented on the requestor device 116. In particular, the ridership error notification 1012 indicates that the ridership error detection system 114 determines a high likelihood that the requestor may be in the wrong vehicle. When the ridership error detection system 114 presents the ridership error notification graphical user interface 1020 at the provider device 104, the ridership error detection system 114 indicates that the provider may have picked up the wrong rider.

The ridership error detection system 114 presents the confirmation element 1014 as part of the ridership error notification graphical user interface 1020. In at least one embodiment, when the ridership error detection system 114 detects that a ridership error likely exists, the ridership error detection system 114 sends a confirmation code to the provider device 104. Based on detecting that the confirmation code is correctly entered using the confirmation element 1014 at the requestor device 116, the ridership error detection system 114 commences the matched ride. In at least one other embodiment, the ridership error detection system 114 sends the confirmation code to the requestor device 116 and sends a prompt to the provider device 104 to enter the confirmation code. In at least one embodiment, instead of sending a confirmation code to one or more of the provider device 104 and the requestor device 116, the ridership error detection system 114 requests the input of other identification information. For instance, the ridership error detection system 114 may prompt the provider to enter the requestor's birth date, phone number, a pre-determined personal identification number, or other type of identifying information.

In at least one embodiment, the confirmation element 1014 presents various other methods for confirming that a ridership error does not exist. For example, the ridership error detection system 114 may implement a Near Field Communication (NFC) system. In such embodiments, the ridership error detection system 114 may present, via the confirmation element 1014, a prompt to tap or bring the requestor device 116 near the provider device 104. Based on the NFC system detecting that the requestor device 116 and the provider device 104 are in close proximity, the ridership error detection system 114 confirms that no ridership error exists.

Based on user interaction with the new ride element 1016, the ridership error detection system 114 determines a new transportation match for the requestor device 116. In at least one embodiment, the ridership error detection system 114 continues to monitor signals from the requestor device 116 to determine that the requestor device 116 has safely exited the incorrect vehicle. For instance, the ridership error detection system 114 analyzes location signals, IMU signals, and/or audio signals to determine that the requestor device 116 has left the vehicle.

The ridership error detection system 114 includes the alert authorities element 1018 in the ridership error notification graphical user interface. Based on detecting user interaction with the alert authorities element 1018, the ridership error detection system 114 sends information regarding the requestor device 116, the provider device 104, and/or the vehicle 102 to the authorities. For example, the ridership error detection system 114 compiles and sends location data, audio data, and data based on other signals to the authorities.

Figure 11:
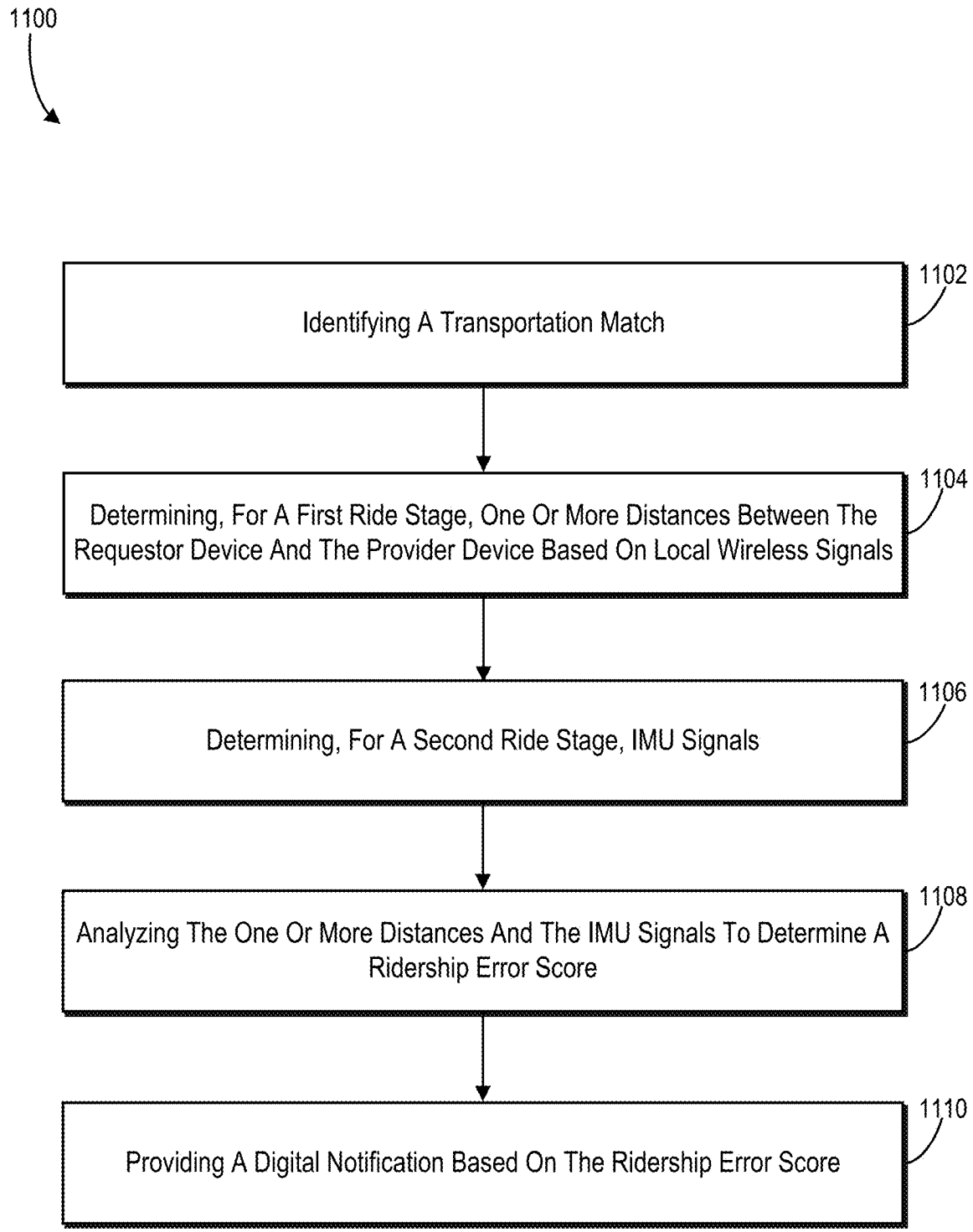
FIG. 11 illustrates a flowchart of a series of acts in a method of providing a digital notification of whether a ridership error exists.

FIGS. 1-10C, the corresponding text, and the examples provide several different systems, methods, techniques, components and/or devices of the ridership error detection system 114 in accordance with one or more embodiments. In addition to the above description, one or more embodiments can also be described in terms of flowcharts including acts for accomplishing a particular result. For example, FIG. 11 illustrates a flowchart of an example sequence of acts in accordance with one or more embodiments. In addition, the acts illustrated in FIG. 11 may be performed with more or fewer acts. Further, the acts may be performed in different orders. The acts described herein may be repeated or performed in parallel with one another or in parallel with different instances of the same or similar acts.

To illustrate, FIG. 11 includes a flowchart of a series of acts 1100 of providing a digital notification based on a ridership error score in accordance with one or more embodiments. As shown, the series of acts 1100 includes an act 1102 of identifying a transportation match. In particular, the act 1102 includes identifying, by a transportation matching system, a transportation match between a requestor device and a provider device.

The series of acts 1100 includes an act 1104 of determining, for a first ride stage, one or more distances between the requestor device and the provider device based on local wireless signals. In particular, the act 1104 determining, for a first ride stage, one or more distances between the requestor device and the provider device based on local wireless signals transmitted between the requestor device and the provider device. In at least one embodiment, the local wireless signals comprise wireless beacons transmitted from the provider device and detected by the requestor device, and include the acts of analyzing the local wireless signals by comparing the one or more distances to a threshold ridership error distance threshold; and determining the ridership error score based on comparing the one or more distances to the threshold ridership error distance threshold.

The series of acts 1100 includes an act 1106 of determining, for a second ride stage, IMU signals. In particular, the act 1106 includes determine, for a second ride stage, IMU signals indicating motion of at least one of the requestor device or the provider device In at least one embodiment, the first ride stage comprises a rider approach ride stage and the second ride stage comprises a requestor enter stage or a close door stage.

The series of acts 1100 also includes an act 1108 of analyzing the one or more distances and the IMU signals to determine a ridership error score. In particular, the act 1108 comprises analyze the one or more distances determined based on the local wireless signals for the first ride stage and the IMU signals indicating the motion for the second ride stage to determine a ridership error score. The act 1108 can further include the acts of analyzing the IMU signals by comparing the IMU signals from the requestor device and the IMU signals from the provider device; and based on determining that the IMU signals from the requestor device and the IMU signals from the provider device satisfy a similarity threshold, determine that the ridership error does not exist.

The series of acts 1100 includes an act 1110 of providing a digital notification based on the ridership error score. In particular, the act 1110 includes providing a digital notification to at least one of the requestor device or the provider device based on the ridership error score.

The series of acts 1100 can include the additional acts of determining the ridership error score by applying a first weight to the first ride stage and a second weight to the second ride stage; determining that a ridership error does not exist by comparing the ridership error score to a ridership error threshold; and providing the digital notification indicating that the ridership error does not exist.

The series of acts 1100 can include the additional acts of identifying audio signals comprising at least one of requestor audio signals detected by the requestor device or provider audio signals detected by the provider device; and determining the ridership error score by: analyzing voice tone characteristics of the audio signals to determine a sentiment associated with the audio signals; analyzing audio signals to identify key terms corresponding to the transportation match; comparing the requestor audio signals and the provider audio signals to determine a similarity between the requestor audio signals and the provider audio signals; or comparing the audio signals with a pre-determined voice signature of a provider or a requestor to determine an identity of a speaker within the audio signals.

The series of acts 1100 can include the additional acts of identifying location signals from one or more of the requestor device and the provider device during a vehicle movement stage; and comparing the location signals to historical location signals associated with historical driving patterns associated with the provider device to determine the ridership error score.

Figure 12:
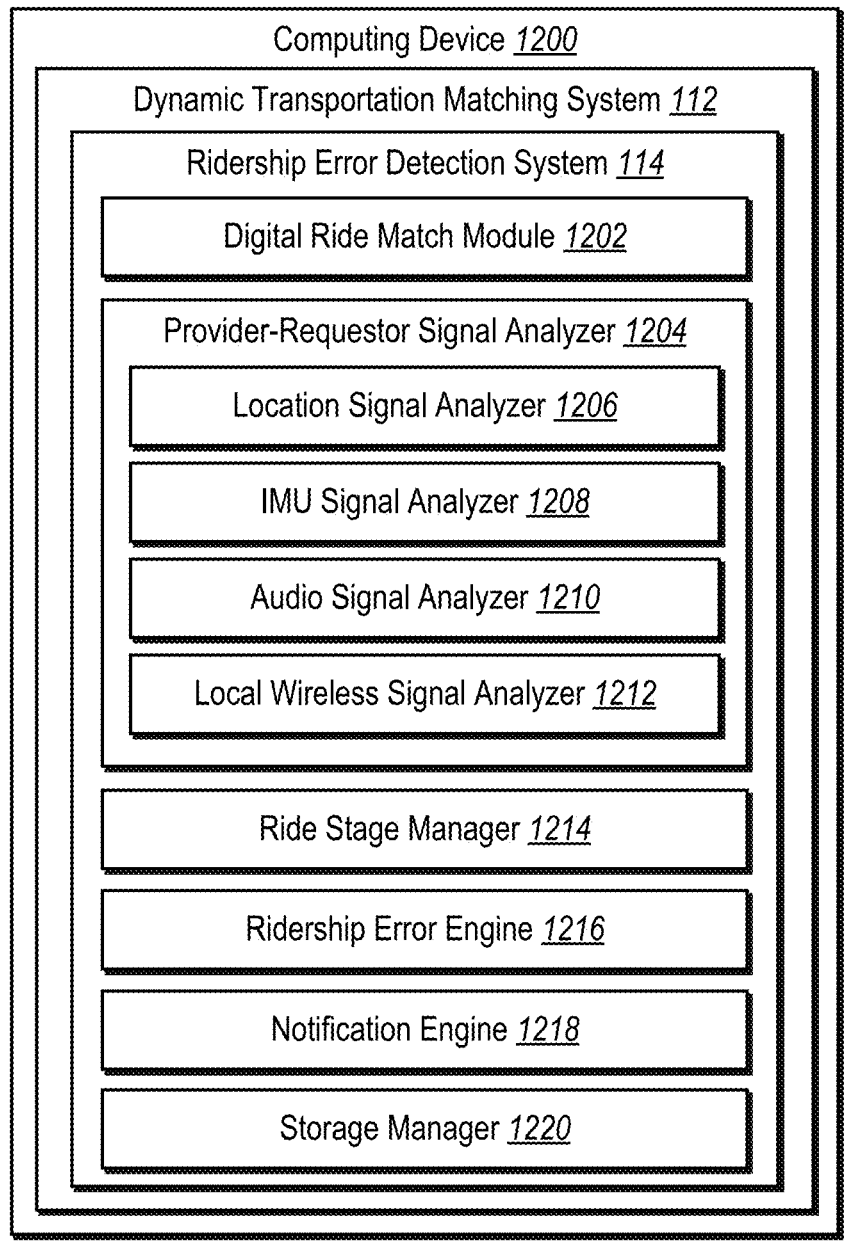
FIG. 12 illustrates a block diagram of an example computing device in accordance with one or more embodiments.

FIG. 12 and the accompanying description provides additional detail regarding components and capabilities of the ridership error detection system 114. Specifically, FIG. 12 illustrates an example schematic diagram of the ridership error detection system 114 implemented within the dynamic transportation matching system 112 on an example computing device 1200 (e.g., one or more of the requestor device 116, the provider device 104, and/or the server(s) 110). As shown in FIG. 12, the ridership error detection system 114 includes a digital ride match module 1202, a provider-requestor signal analyzer 1204, a ride stage manager 1214, a ridership error engine 1216, a notification engine 1218, and a storage manager 1220.

As mentioned, the ridership error detection system 114 includes the digital ride match module 1202. The digital ride match module 1202 generates, coordinates, and stores transportation matches between requestor devices and provider devices. In particular, the digital ride match module 1202 determines available provider devices and matches them with requestor devices. The digital ride match module 1202 coordinates transportation matches. For example, the digital ride match module 1202 coordinates pickup locations, dropoff locations, and ride routes. Additionally, the digital ride match module 1202 stores transportation match information including information specific to the requestor devices and provider devices.

The ridership error detection system 114 also includes the provider-requestor signal analyzer 1204. Generally, the provider-requestor signal analyzer 1204 accesses, analyzes, and stores provider-requestor consistency signals from provider devices and requestor devices. More specifically, the provider-requestor signal analyzer 1204 analyzes one or more sets of provider-requestor consistency signals. For example, the provider-requestor signal analyzer 1204 identifies sets of provider-requestor consistency signals to analyze for various ride stages. Additionally, the provider-requestor signal analyzer 1204 determines a confidence score for determining whether or not a ridership error exists. The provider-requestor signal analyzer 1204 communicates with the ride stage manager 1214 to determine ride stages. The provider-requestor signal analyzer 1204 includes a location signal analyzer 1206, an IMU signal analyzer 1208, an audio signal analyzer 1210, and a local wireless signal analyzer 1212.

The location signal analyzer 1206 accesses, analyzes, and stores location signals from provider and requestor devices. The location signal analyzer 1206 compares the locations of the provider and requestor devices across ride stages. Furthermore, the location signal analyzer 1206 determines location signal matches and mismatches and communicates the matches/mismatches to the provider-requestor signal analyzer 1204.

The IMU signal analyzer 1208 accesses, analyzes, and stores IMU signals from provider devices and requestor devices. The IMU signal analyzer 1208 determines IMU signal matches and mismatches based on analyzing the IMU signals across ride stages.

The audio signal analyzer 1210 accesses, analyzes, and stores audio signals from provider devices and requestor devices. The audio signal analyzer 1210 compares provider audio signals and requestor audio signals, analyzes the audio signals for voice signatures, and analyzes voice tone characteristics of the audio signals.

The local wireless signal analyzer 1212 accesses local wireless signals from provider devices and requestor devices. The local wireless signal analyzer 1212 coordinates signal IDs for devices involved in a transportation match. Additionally, the local wireless signal analyzer 1212 identifies one or more transmitting devices and one or more scanning devices within a ride match. The local wireless signal analyzer 1212 predicts a distance between the requestor device and the provider device to determine the location of the requestor device relative to the vehicle. Furthermore, the local wireless signal analyzer 1212 determines a signal strength and degree of certainty for all local wireless signals.

As mentioned, the ridership error detection system 114 includes the ride stage manager 1214. The ride stage manager 1214 communicates with the provider-requestor signal analyzer 1204 to access signals from requestor devices and provider devices. The ride stage manager 1214 determines ride stages based on the received signals.

The ridership error engine 1216 identifies whether ridership errors exist within matched rides. In particular, the ridership error engine 1216 communicates with the provider-requestor signal analyzer 1204 and the ride stage manager 1214 to determine whether ridership errors exist based on the sets of provider-requestor consistency signals across the ride stages.

The notification engine 1218 manages notifications sent to the provider devices and the requestor devices involved in a transportation match. In particular, the notification engine 1218 generates and manages ridership error notifications. More specifically, the notification engine 1218 can display, at the provider device and the requestor device, notifications indicating whether or not a ridership error exists.

The storage manager 1220 stores information utilized by the ridership error detection system 114. In particular, the storage manager 1220 stores training data for the various trained machine learning models (e.g., vocal emotion machine learning model, ride mismatch machine learning model, etc.). Additionally, the storage manager 1220 stores historical data of specific provider computing devices linked with historical driving patterns. This includes historical acceleration or IMU data, historical location data, historical routes, and historical speed. Furthermore, the storage manager 1220 stores audio signal data including predetermined voice signatures.

The components of the ridership error detection system 114 can include software, hardware, or both. For example, the components of the ridership error detection system 114 can include one or more instructions stored on a computer-readable storage medium and executable by processors of one or more computing devices (e.g., the computing device 1200). When executed by the one or more processors, the computer-executable instructions of the ridership error detection system 114 can cause the computing device 1200 to perform the methods described herein. Alternatively, the components of the ridership error detection system 114 can comprise hardware, such as a special purpose processing device to perform a certain function or group of functions. Additionally or alternatively, the components of the ridership error detection system 114 can include a combination of computer-executable instructions and hardware.

Furthermore, the components of the ridership error detection system 114 performing the functions described herein may, for example, be implemented as part of a stand-alone application, as a module of an application, as a plug-in for applications including content management applications, as a library function or functions that may be called by other applications, and/or as a cloud-computing model. Thus, the components of the ridership error detection system 114 may be implemented as part of a stand-alone application on a personal computing device or a mobile device. Alternatively or additionally, the components of the ridership error detection system 114 may be implemented in any application that allows creation and delivery of marketing content to users, including, but not limited to, various applications.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
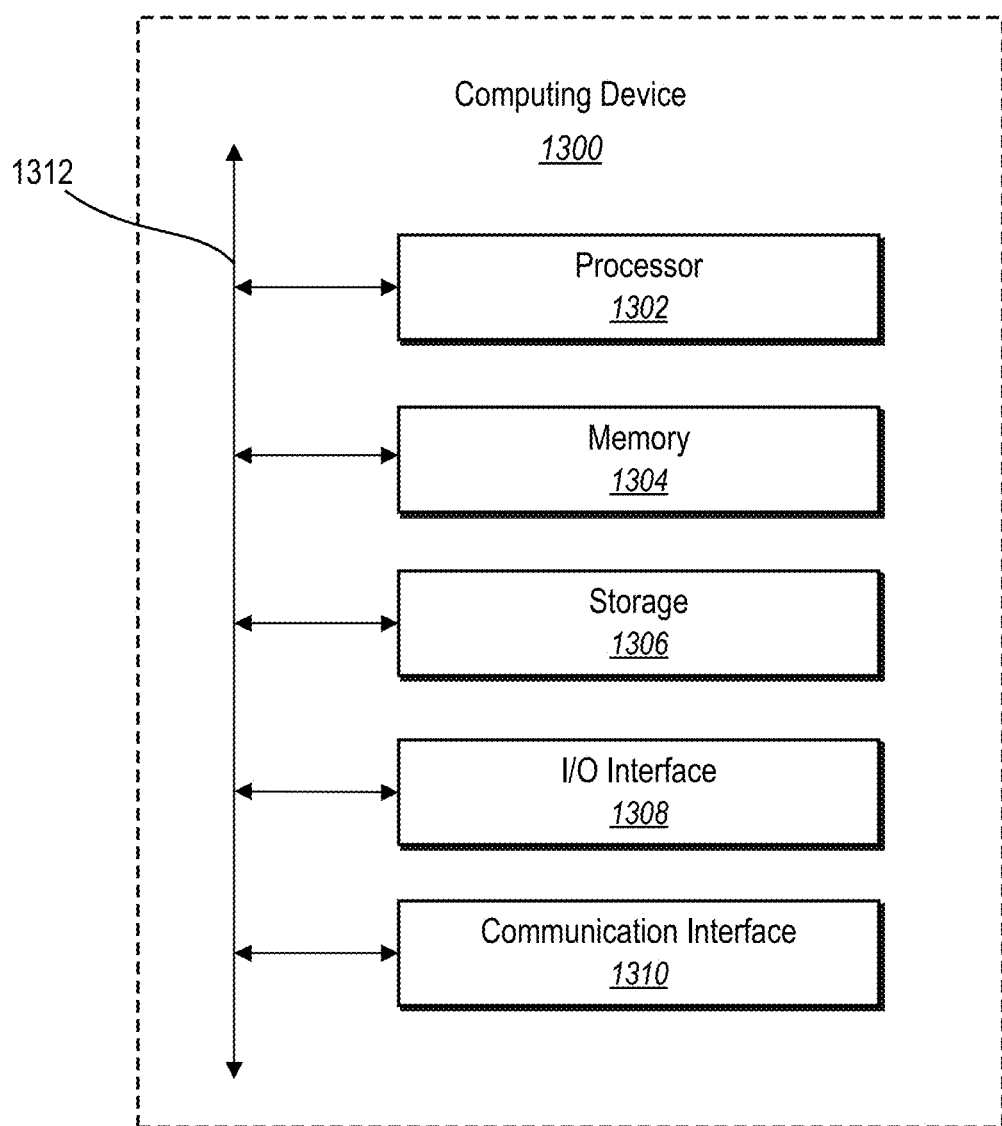
FIG. 13 illustrates a block diagram of an example computing device in accordance with one or more embodiments.

FIG. 13 illustrates, in block diagram form, an exemplary computing device 1300 (e.g., the computing device 1200, the server(s) 110, the provider device 104, and/or the requestor device 116) that may be configured to perform one or more of the processes described above. One will appreciate that the ridership error detection system 114 can comprise implementations of the computing device 1300, including, but not limited to, the requestor device 116, the provider device 104, and/or the server(s) 110. As shown by FIG. 13, the computing device can comprise a processor 1302, memory 1304, a storage device 1306, an I/O interface 1308, and a communication interface 1310. In certain embodiments, the computing device 1300 can include fewer or more components than those shown in FIG. 13. Components of computing device 1300 shown in FIG. 13 will now be described in additional detail.

In particular embodiments, the processor 1302 includes hardware for executing instructions, such as those making up a computer program. As an example, and not by way of limitation, to execute instructions, the processor 1302 may retrieve (or fetch) the instructions from an internal register, an internal cache, memory 1304, or a storage device 1306 and decode and execute them.

The computing device 1300 includes memory 1304, which is coupled to the processor 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive ("HDD"), flash memory, a Universal Serial Bus ("USB") drive or a combination of these or other storage devices.

The computing device 1300 also includes one or more input or output interface 1308 (or "I/O interface 1308"), which are provided to allow a user (e.g., requestor or provider) to provide input to (such as user strokes), receive output from, and otherwise transfer data to and from the computing device 1300. The I/O interface 1308 may include a mouse, keypad or a keyboard, a touch screen, camera, optical scanner, network interface, modem, other known I/O devices or a combination of such. The touch screen may be activated with a stylus or a finger.

The I/O interface 1308 may include one or more devices for presenting output to a user, including, but not limited to, a graphics engine, a display (e.g., a display screen), one or more output providers (e.g., display providers), one or more audio speakers, and one or more audio providers. In certain embodiments, interface 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include a bus 1312. The bus 1312 can comprise hardware, software, or both that connects components of computing device 1300 to each other.

Figure 14:
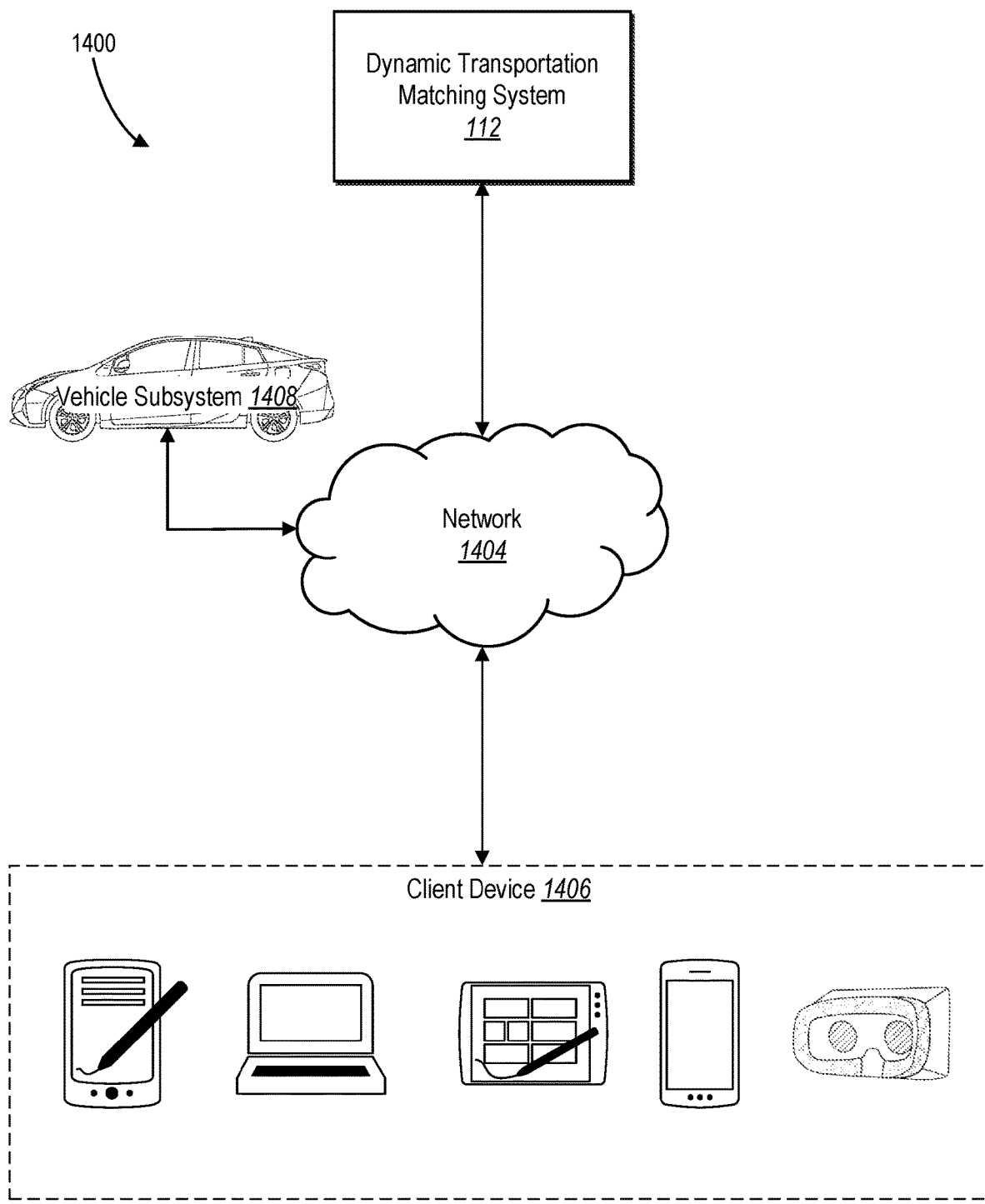
FIG. 14 illustrates an example environment for a dynamic transportation system in accordance with one or more embodiments.

FIG. 14 illustrates an example network environment 1400 of the dynamic transportation matching system 112. The network environment 1400 includes a client device 1406 (e.g., the requestor device 116 or the provider device 104), the dynamic transportation matching system 112, and a vehicle subsystem 1408 connected to each other by a network 1404. Although FIG. 14 illustrates a particular arrangement of the client device 1406, the dynamic transportation matching system 112, the vehicle subsystem 1408, and the network 1404, this disclosure contemplates any suitable arrangement of client device 1406, the dynamic transportation matching system 112, the vehicle subsystem 1408, and the network 1404. As an example, and not by way of limitation, two or more of client device 1406, the dynamic transportation matching system 112, and the vehicle subsystem 1408 communicate directly, bypassing network 1404. As another example, two or more of client device 1406, the dynamic transportation matching system 112, and the vehicle subsystem 1408 may be physically or logically co-located with each other in whole or in part.

Moreover, although FIG. 14 illustrates a particular number of client devices 1406, dynamic transportation matching system 112, vehicle subsystems 1408, and networks 1404, this disclosure contemplates any suitable number of client devices 1406, dynamic transportation matching system 112, vehicle subsystems 1408, and networks 1404. As an example, and not by way of limitation, network environment 1400 may include multiple client device 1406, dynamic transportation matching system 112, vehicle subsystems 1408, and/or networks 1404.

This disclosure contemplates any suitable network 1404. As an example, and not by way of limitation, one or more portions of network 1404 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1404 may include one or more networks 1404.

Links may connect client device 1406, ridership error detection system 114, and vehicle subsystem 1408 to network 1404 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1400. One or more first links may differ in one or more respects from one or more second links.

In particular embodiments, the client device 1406 may be an electronic device including hardware, software, or embedded logic components or a combination of two or more such components and capable of carrying out the appropriate functionalities implemented or supported by client device 1406. As an example, and not by way of limitation, a client device 1406 may include any of the computing devices discussed above in relation to FIG. 13. A client device 1406 may enable a network user at the client device 1406 to access network 1404. A client device 1406 may enable its user to communicate with other users at other client devices 1406.

In particular embodiments, the client device 1406 may include a requestor application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1406 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1406 one or more Hyper Text Markup Language ("HTML") files responsive to the HTTP request. The client device 1406 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, dynamic transportation matching system 112 may be a network-addressable computing system that can host a transportation matching network. The dynamic transportation matching system 112 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the dynamic transportation matching system 112. In addition, the dynamic transportation matching system 112 may manage identities of service requestors such as users/requestors. In particular, the dynamic transportation matching system 112 may maintain requestor data such as driving/riding histories, personal data, or other user data in addition to navigation and/or traffic management services or other location services (e.g., GPS services).

In particular embodiments, the dynamic transportation matching system 112 may manage transportation matching services to connect a user/requestor with a vehicle and/or provider. By managing the transportation matching services, the dynamic transportation matching system 112 can manage the distribution and allocation of resources from vehicle systems and user resources such as GPS location and availability indicators, as described herein.

The dynamic transportation matching system 112 may be accessed by the other components of network environment 1400 either directly or via network 1404. In particular embodiments, the dynamic transportation matching system 112 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 112 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1406, or a dynamic transportation matching system 112 to manage, retrieve, modify, add, or delete, the information stored in data store.

In particular embodiments, the dynamic transportation matching system 112 may provide users with the ability to take actions on various types of items or objects, supported by the dynamic transportation matching system 112. As an example, and not by way of limitation, the items and objects may include transportation matching networks to which users of the dynamic transportation matching system 112 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 112 or by an external system of a third-party system, which is separate from dynamic transportation matching system 112 and coupled to the dynamic transportation matching system 112 via a network 1404.

In particular embodiments, the dynamic transportation matching system 112 may be capable of linking a variety of entities. As an example, and not by way of limitation, the dynamic transportation matching system 112 may enable users to interact with each other or other entities, or to allow users to interact with these entities through an application programming interfaces ("API") or other communication channels.

In particular embodiments, the dynamic transportation matching system 112 may include a variety of servers, sub-systems, programs, modules, logs, and data stores. In particular embodiments, the dynamic transportation matching system 112 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requestor profile) store, connection store, third-party content store, or location store. The dynamic transportation matching system 112 may also include suitable components such as network interfaces, security mechanisms, load balancers, failover servers, management-and-network-operations consoles, other suitable components, or any suitable combination thereof. In particular embodiments, the dynamic transportation matching system 112 may include one or more user-profile stores for storing user profiles for transportation providers and/or transportation requestors. A user profile may include, for example, biographic information, demographic information, behavioral information, social information, or other types of descriptive information, such as interests, affinities, or location.

The web server may include a mail server or other messaging functionality for receiving and routing messages between the dynamic transportation matching system 112 and one or more client devices 1406. An action logger may be used to receive communications from a web server about a user's actions on or off the dynamic transportation matching system 112. In conjunction with the action log, a third-party-content-object log may be maintained of user exposures to third-party-content objects. A notification controller may provide information regarding content objects to a client device 1406. Information may be pushed to a client device 1406 as notifications, or information may be pulled from client device 1406 responsive to a request received from client device 1406. Authorization servers may be used to enforce one or more privacy settings of the users of the dynamic transportation matching system 112. A privacy setting of a user determines how particular information associated with a user can be shared. The authorization server may allow users to opt in to or opt out of having their actions logged by the dynamic transportation matching system 112 or shared with other systems, such as, for example, by setting appropriate privacy settings. Third-party-content-object stores may be used to store content objects received from third parties. Location stores may be used for storing location information received from client devices 1406 associated with users.

In addition, the vehicle subsystem 1408 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1408 can include an autonomous vehicle—i.e., a vehicle that does not require a human operator. In these embodiments, the vehicle subsystem 1408 can perform maneuvers, communicate, and otherwise function without the aid of a human provider, in accordance with available technology.

In particular embodiments, the vehicle subsystem 1408 may include one or more sensors incorporated therein or associated thereto. For example, sensor(s) can be mounted on the top of the vehicle subsystem 1408 or else can be located within the interior of the vehicle subsystem 1408. In certain embodiments, the sensor(s) can be located in multiple areas at once i.e., split up throughout the vehicle subsystem 1408 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1408 may include a communication device capable of communicating with the client device 1406 and/or the ridership error detection system 114. For example, the vehicle subsystem 1408 can include an on-board computing device communicatively linked to the network 1404 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
  at least one processor; and
  a computer-readable storage medium storing instructions that, when executed by the at least one processor, cause the system to:
  identify a transportation match between a requestor device and a provider device;
  determine, for a first ride stage, one or more distances between the requestor device and the provider device based on local wireless signals transmitted between the requestor device and the provider device;
  receive, via an IMU from at least one of the requestor device or the provider device, IMU signals indicating motion of the at least one of the requestor device or the provider device for a second ride stage;
  analyze the one or more distances determined based on the local wireless signals for the first ride stage and the IMU signals indicating the motion for the second ride stage to determine a ridership error score by applying a first weight to the first ride stage and a second weight to the second ride stage; and
  provide a digital notification to at least one of the requestor device or the provider device based on the ridership error score.

2. The system as recited in claim 1, wherein the local wireless signals comprise wireless beacons transmitted from the provider device and detected by the requestor device and further comprising instructions that, when executed by at least one processor, cause the system to:
  analyze the local wireless signals by comparing the one or more distances to a threshold ridership error distance threshold; and
  determine the ridership error score based on comparing the one or more distances to the threshold ridership error distance threshold.

3. The system as recited in claim 1, further comprising instructions that, when executed by the at least one processor, cause the system to:
  determine that a ridership error does not exist by comparing the ridership error score to a ridership error threshold; and
  provide the digital notification indicating that the ridership error does not exist.

4. The system as recited in claim 1, wherein the first ride stage comprises a rider approach ride stage and the second ride stage comprises a requestor enter stage or a close door stage.

5. The system as recited in claim 1, further comprising instructions that, when executed by the at least one processor, cause the system to:
  analyze the IMU signals by comparing the IMU signals from the requestor device and the IMU signals from the provider device; and
  based on determining that the IMU signals from the requestor device and the IMU signals from the provider device satisfy a similarity threshold, determine that a ridership error does not exist.

6. The system as recited in claim 1, further comprising instructions that, when executed by the at least one processor, cause the system to:
  identify audio signals comprising at least one of requestor audio signals detected by the requestor device or provider audio signals detected by the provider device; and
  determine the ridership error score by:
    analyzing voice tone characteristics of the audio signals to determine a sentiment associated with the audio signals;
    analyzing audio signals to identify key terms corresponding to the transportation match;
    comparing the requestor audio signals and the provider audio signals to determine a similarity between the requestor audio signals and the provider audio signals; or
    comparing the audio signals with a pre-determined voice signature of a provider or a requestor to determine an identity of a speaker within the audio signals.

7. The system as recited in claim 1, further comprising instructions that, when executed by the at least one processor, cause the system to:
  identify location signals from one or more of the requestor device and the provider device during a vehicle movement stage; and
  compare the location signals to historical location signals associated with historical driving patterns associated with the provider device to determine the ridership error score.

8. A method comprising:
  identifying a transportation match between a requestor device and a provider device;
  determining, for a first ride stage, one or more distances between the requestor device and the provider device based on local wireless signals transmitted between the requestor device and the provider device;
  receiving, from at least one of the requestor device or the provider device, IMU signals indicating motion of the at least one of the requestor device or the provider device for a second ride stage;
  analyzing the one or more distances determined based on the local wireless signals for the first ride stage and the IMU signals indicating the motion for the second ride stage to determine a ridership error score by applying a first weight to the first ride stage and a second weight to the second ride stage; and providing a digital notification to at least one of the requestor device or the provider device based on the ridership error score.

9. The method as recited in claim 8, wherein the local wireless signals comprise wireless beacons transmitted from the provider device and detected by the requestor device, and further comprising:
analyzing the local wireless signals by comparing the one or more distances to a threshold ridership error distance threshold; and
determining the ridership error score based on comparing the one or more distances to the threshold ridership error distance threshold.

10. The method as recited in claim 8, further comprising:
determining that a ridership error does not exist by comparing the ridership error score to a ridership error threshold; and
providing the digital notification indicating that the ridership error does not exist.

11. The method as recited in claim 8, wherein the first ride stage comprises a rider approach ride stage and the second ride stage comprises a requestor enter stage or a close door stage.

12. The method as recited in claim 8, further comprising:
analyzing the IMU signals by comparing the IMU signals from the requestor device and the IMU signals from the provider device; and
based on determining that the IMU signals from the requestor device and the IMU signals from the provider device satisfy a similarity threshold, determine that a ridership error does not exist.

13. The method as recited in claim 8, further comprising:
identifying audio signals comprising at least one of requestor audio signals detected by the requestor device or provider audio signals detected by the provider device; and
determining the ridership error score by:
analyzing voice tone characteristics of the audio signals to determine a sentiment associated with the audio signals;
analyzing audio signals to identify key terms corresponding to the transportation match;
comparing the requestor audio signals and the provider audio signals to determine a similarity between the requestor audio signals and the provider audio signals; or
comparing the audio signals with a pre-determined voice signature of a provider or a requestor to determine an identity of a speaker within the audio signals.

14. The method as recited in claim 8, further comprising:
identifying location signals from one or more of the requestor device and the provider device during a vehicle movement stage; and
comparing the location signals to historical location signals associated with historical driving patterns associated with the provider device to determine the ridership error score.

15. A non-transitory computer readable medium comprising instructions that, when executed by at least one processor, cause a computing device to:
identify a transportation match between a requestor device and a provider device;
determine, for a first ride stage, one or more distances between the requestor device and the provider device based on local wireless signals transmitted between the requestor device and the provider device;
receive, from at least one of the requestor device or the provider device, IMU signals indicating motion of the at least one of the requestor device or the provider device for a second ride stage;
analyze the one or more distances determined based on the local wireless signals for the first ride stage and the IMU signals indicating the motion for the second ride stage to determine a ridership error score by applying a first weight to the first ride stage and a second weight to the second ride stage; and
provide a digital notification to at least one of the requestor device or the provider device based on the ridership error score.

16. The non-transitory computer readable medium as recited in claim 15, wherein the local wireless signals comprise wireless beacons transmitted from the provider device and detected by the requestor device and further comprising instructions that, when executed by at least one processor, cause the computing device to:
analyze the local wireless signals by comparing the one or more distances to a threshold ridership error distance threshold; and
determine the ridership error score based on comparing the one or more distances to the threshold ridership error distance threshold.

17. The non-transitory computer readable medium as recited in claim 15, further comprising instructions that, when executed by the at least one processor, cause the computing device to:
determine the ridership error score by applying a first weight to the first ride stage and a second weight to the second ride stage;
determine that a ridership error does not exist by comparing the ridership error score to a ridership error threshold; and
provide the digital notification indicating that the ridership error does not exist.

18. The non-transitory computer readable medium as recited in claim 15, wherein the first ride stage comprises a rider approach ride stage and the second ride stage comprises a requestor enter stage or a close door stage.

19. The non-transitory computer readable medium as recited in claim 15, further comprising instructions that, when executed by the at least one processor, cause the computing device to:
analyze the IMU signals by comparing the IMU signals from the requestor device and the IMU signals from the provider device; and
based on determining that the IMU signals from the requestor device and the IMU signals from the provider device satisfy a similarity threshold, determine that a ridership error does not exist.

20. The non-transitory computer readable medium as recited in claim 15, further comprising instructions that, when executed by the at least one processor, cause the computing device to:
identify audio signals comprising at least one of requestor audio signals detected by the requestor device or provider audio signals detected by the provider device; and
determine the ridership error score by:
analyzing voice tone characteristics of the audio signals to determine a sentiment associated with the audio signals;
analyzing audio signals to identify key terms corresponding to the transportation match;

comparing the requestor audio signals and the provider audio signals to determine a similarity between the requestor audio signals and the provider audio signals; or
comparing the audio signals with a pre-determined voice signature of a provider or a requestor to determine an identity of a speaker within the audio signals.

\* \* \* \* \*